United States Patent
Kato et al.

(10) Patent No.: US 6,395,849 B1
(45) Date of Patent: *May 28, 2002

(54) PROCESSES FOR PRODUCING N,N-DIALKYLALLYLAMINE POLYMERS AND N, N-DIALKYLLYLAMINE POLYMERS

(75) Inventors: Tadashi Kato; Yasuhiro Fujita, both of Koriyama; Ikuo Hayashi, Koriyama; Hitoshi Ohta; Kazuhiko Kitamura, both of Suwa, all of (JP)

(73) Assignee: Nitto Boseki Co., Ltd., Fukushima-ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/530,489

(22) PCT Filed: Sep. 25, 1998

(86) PCT No.: PCT/JP98/04289

§ 371 (c)(1),
(2), (4) Date: May 31, 2000

(87) PCT Pub. No.: WO99/21901

PCT Pub. Date: May 6, 1999

(30) Foreign Application Priority Data

Oct. 29, 1997 (JP) .......................... H9-311582
Nov. 7, 1997 (JP) .......................... H9-320546
Dec. 8, 1997 (JP) .......................... H9-352007

(51) Int. Cl.[7] .................................. C08F 2/16
(52) U.S. Cl. ..................... 526/219.5; 526/310
(58) Field of Search ................ 526/219.5, 310

(56) References Cited

U.S. PATENT DOCUMENTS 4,053,512 A    10/1977  Panzer et al.

FOREIGN PATENT DOCUMENTS

| JP | 49-6078 | 1/1974 |
| JP | 49-006078 | 1/1974 |
| JP | 60-108405 | 6/1985 |
| JP | 63-33484 | 2/1988 |
| JP | 2-14364 | 4/1990 |
| JP | 2-56361 | 11/1990 |
| JP | 2-56362 | 11/1990 |
| JP | 2-57082 | 12/1990 |
| JP | 2-57083 | 12/1990 |
| JP | 6-2780 | 1/1994 |
| JP | 7-68298 | 7/1995 |
| JP | 9-78056 | 3/1997 |
| JP | 09-078056 | 3/1997 |

*Primary Examiner*—David W. Wu
*Assistant Examiner*—William K Cheung
(74) *Attorney, Agent, or Firm*—Nixon & Vanderhye

(57) ABSTRACT

The present invention relates to processes for industrially advantageously producing, in high yields, an N,N-dialkylallylamine polymer or an addition salt thereof, a copolymer of N,N-dialkylallylamine and monoallylamine or an addition salt thereof, and a copolymer of N,N-dialkylallylamine and diallylamine or an addition salt thereof, which are useful for various uses in the field of fine chemicals and particularly useful as a water-resistance-imparting agent for an inkjet ink.

28 Claims, 13 Drawing Sheets

PROCESSES FOR PRODUCING N,N-DIALKYLALLYLAMINE POLYMERS AND N,N-DIALKYLLYLAMINE POLYMERS

TECHNICAL FIELD

The present invention relates to a process for the production of an N,N-dialkylallylamine polymer and an N,N-dialkylallylamine polymer. More specifically, it relates to a process for efficiently and industrially advantageously producing an N,N-dialkylallylamine polymer or an addition salt thereof, a copolymer of N,N-dialkylallylamine and a monoallylamine or an addition salt thereof, and a copolymer of N,N-dialkylallylamine and a diallylamine or an addition salt thereof, which are useful in the field of fine chemicals, and also to an N,N-dialkylallylamine polymer or an addition salt thereof, a copolymer of N,N-dialkylallylamine and a monoallylamine or an addition salt thereof, and a copolymer of N,N-dialkylallylamine and a diallylamine or an addition salt thereof.

TECHNICAL BACKGROUND

A polyallylamine (allylamine polymer) is a linear olefinic polymer containing primary amino groups in side chains, and it is a cationic polymer which is well soluble in water and positively charged in water. A polyallylamine has characteristic reactive polymer structure and properties and is therefore used in remarkably wide fields of dye fixing agents for reactive dyes, dye fixing agents for direct dyes, additives to inkjet recording paper, and the like. Concerning a method of producing the polyallylamine, there is known a method in which an inorganic acid salt of a monoallylamine is polymerized in water or a polar solvent in the presence of a radical polymerization initiator containing an azo group.

An N,N-dialkylallylamine polymer or an addition salt thereof is considered to be a very interesting practical polymer when compared with a polyallylamine. As described in Comparative Example 12 on page 9 of JP-B-2-14364, however, polymerization of a monomer such as N,N-dimethylallylamine in the presence of a radical polymerization initiator gives only a trace amount (yield 5%) of a polymer, and the monomer undergoes almost no polymerization. No reports have so far said that an N,N-dialkylallylamine polymer is obtained by polymerization at a high polymerization rate.

As a method of producing an N,N-dialkylallylamine polymer, there is therefore known only a method in which an N,N-dialkylallylamine polymer or an addition salt thereof is produced from a certain polymer by chemically replacing substituents of side chains of the polymer. As one method included in the above method, there is known a method in which poly(N,N-dialkylacrylamide) such as poly(N,N-dimethylacrylamide) is reacted with sodium.bis(2-methoxyethoxy)aluminum hydride to produce N,N-dialkylallylamine polymer (U.S. Pat. No. 4,053,512). However, the above method has a problem that industrial production of the end polymer is difficult since the reaction is carried out under anhydrous conditions. As another method, there is known a method in which formic acid and formaldehyde are allowed to react with a polyallylamine to produce an N,N-dialkylallylamine polymer (JP-A-60-108405). Since, however, this method requires two steps for obtaining the end product from a monoallylamine as a starting material, it is not thought to be a satisfactory method.

As described above, it is thought that N,N-dialkylallylamine per se does not easily undergo polymerization, and under the present circumstances, nothing has been reported concerning the successful production of a copolymer from N,N-dialkylallylamine and a monoallylamine or a copolymer from N,N-dialkylallylamine and diallylamine by polymerization.

As a consequence, although N,N-dialkylallylamine, monoallylamines and diallylamines are industrially produced, neither a copolymer of N,N-dialkylallylamine and monoallylamine nor a copolymer of N,N-dialkylallylamine and diallylamine is industrially produced at present.

Meanwhile, as a printer, a dot impact printer, a laser printer, a thermal printer, an inkjet printer, etc., are known. Of these, an inkjet printer is widely used in recent years due to characteristic features such as fast printing with a low noise, a low printing cost, downsizing and weight-decreasing feasibility based on a simple mechanism, an easiness in multi-color printing and image size increasing, non-necessity of development and fixing and high adaptability of a record pattern.

In the above inkjet printer, conventionally, recording is carried out by an inkjet recording method in which an ink blob is generated and ejected by an electrostatic suction method, an air compression method, a method using electric deformation of a piezoelectric element or a method using a pressure caused by heat-blowing, and further, the ink blob is allowed to adhere to a recording paper. As an ink for use with the above recording method, generally, there is used a water-based ink prepared by dissolving or dispersing a colorant such as a dye or a pigment in water, a water-soluble organic solvent or a mixture of these.

In recent years, inkjet recording is required to satisfy water resistance on an ordinary paper, and as a water-based ink composition for attaining the above requirement, combinations of polyethyleneimine and polyamines mainly including modified products thereof with dyes have been studied in various ways.

However, the above polyamines have defects that the water resistance thereof is insufficient, that the shelf life thereof is poor and that the dyes that can be selected are limited.

On the other hand, attempts have been made to use an allylamine polymer as a water-resistance-imparting agent in an ink composition. In this case, however, there are required complicated procedures of reacting an allylamine hydrochloride polymer with a dye (dye containing acid salt such as sulfonic acid salt) to prepare a dye containing an allylamine polymer as a counter cation and removing an inorganic salt, etc., by isolating it as a solid before use, as is described in JP-A-63-33484. Further, for avoiding the above complicated procedures, an allylamine polymer is taken as a free polymer in advance, and further, an inorganic salt, etc., are removed. Even in this case, when the allylamine polymer is used in an ink, the ink is liable to cause aggregation, etc., which causes a problem in practical use.

DISCLOSURE OF THE INVENTION

Under the above circumstances, it is a first object of the present invention to provide a process for industrially advantageously producing an N,N-dialkylallylamine polymer and a copolymer of N,N-dialkylallylamine and other allylamine at high yields, which are useful for various uses in the field of fine chemicals and particularly useful as a water-resistance-imparting agent for an inkjet ink.

It is a second object of the present invention to provide an N,N-dialkylallylamine polymer and a copolymer of N,N-dialkylallylamine and other allylamine, which are useful in the above field.

The present inventors have made diligent studies to achieve the above objects, and as a result have found that the first object can be achieved by polymerizing an addition salt of N,N-dialkylallylamine, or copolymerizing an addition salt of N,N-dialkylallylamine and an addition salt of a monoallylamine or an addition salt of a diallyamine, in the presence of a specific radical polymerization initiator, or by further treating a polymerization solution thereof in a specific method and then subjecting the polymerization product to an ion exchange membrane electrodialysis.

It has been further found that the above second object is achieved by an N,N-dialkylallylamine polymer having a weight average molecular weight in a specific range and an ignition residue content equivalent to, or smaller than, a specific value, a copolymer of N,N-dialkylallylamine and monoallylamine or N-alkylmonoallylamine or an addition salt thereof, or a copolymer of N,N-dialkylallylamine and diallylamine or N-substituted diallylamine or an addition salt thereof.

The present invention has been completed on the basis of the above findings.

That is, the present invention provides;

(1) a process for the production of an N,N-dialkylallylamine polymer having a recurring unit of the general formula (II),

wherein each of $R^1$ and $R^2$ is independently an alkyl group having 1 to 4 carbon atoms, or an addition salt thereof, which comprises polymerizing an addition salt of an N,N-dialkylallylamine of the general formula (I),

wherein $R^1$ and $R^2$ are as defined above, in an aqueous solvent in the presence of 2 to 100 mol %, based thereon, of a radical initiator having a molecule containing an azo group or a persulfate radical initiator, and optionally neutralizing a polymerization solution (to be referred to as "Production Process 1" hereinafter), (2) a process for the production of an N,N-dialkylallylamine polymer having a recurring unit of the above general formula (II) or an addition salt thereof, which comprises polymerizing an addition salt of an N,N-dialkylallylamine of the above general formula (I) in an aqueous solvent in the presence of 2 to 100 mol %, based thereon, of a radical initiator having a molecule containing an azo group or a persulfate radical initiator, then, neutralizing a polymerization solution to bring a formed polymer into a free state, further, distilling off a residual monomer under reduced pressure, then, subjecting a remaining polymerization solution to an ion exchange membrane electrodialysis, and optionally carrying out acid treatment (to be referred to as "production process 2" hereinafter), (3) a process for the production of a copolymer of N,N-dialkylallylamine and monoallylamine, the copolymer having recurring units of the general formula (IV),

wherein $R^3$ is a hydrogen atom or an alkyl group having 1 to 4 carbon atoms, and the above general formula (II), or an addition salt thereof, which comprises copolymerizing an addition salt of a monoallylamine of the general formula (III),

wherein $R^3$ is as defined above, and an addition salt of an N,N-dialkylallylamine of the above general formula (I) in an aqueous solvent in the presence of a radical initiator having a molecule containing an azo group or a persulfate radical initiator, and optionally neutralizing a polymerization solution (to be referred to as Production Process 3" hereinafter), (4) a process for the production of a copolymer of N,N-dialkylallylamine and monoallylamine, the copolymer having recurring units of the above general formulae (IV) and (II), or an addition salt thereof, which comprises copolymerizing an addition salt of a monoallylamine of the above general formula (III) and an addition salt of N,N-dialkylallylamine of the above general formula (I) in an aqueous solvent in the presence of a radical initiator having a molecule containing an azo group or a persulfate radical initiator, then, neutralizing a polymerization solution to bring a formed copolymer into a free state, further, distilling off a remaining monomer under reduced pressure, subjecting the polymerization solution to an ion exchange membrane electrodialysis, and optionally carrying out acid treatment (to be referred to as "Production Process 4" hereinafter), (5) a process for the production of a copolymer of N,N-dialkylallylamine and N-substituted or non-substituted diallylamine, or an addition salt thereof, which comprises copolymerizing an addition salt of an N,N-dialkylallylamine of the above general formula (I) and an addition salt of an N-substituted or non-substituted diallylamine in an aqueous solvent in the presence of a radical initiator having a molecule containing an azo group or a persulfate radical initiator, and optionally neutralizing a polymerization solution (to be referred to as "Production Process 5" hereinafter), (6) a process for the production of a copolymer of N,N-dialkylallylamine and N-substituted or non-substituted diallylamine, or an addition salt thereof, which comprises copolymerizing an addition salt of an N,N-dialkylallylamine of the above general formula (I) and an addition salt of an N-substituted or non-substituted diallylamine in an aqueous solvent in the presence of a radical initiator having a molecule containing an azo group or a persulfate radical initiator, neutralizing a polymerization solution to bring a formed copolymer into a free state, further, distilling off a residual monomer under reduced pressure, then, subjecting the polymerization solution to an ion exchange membrane electrodialysis, and optionally carrying out acid treatment (to be referred to as "Production Process 6" hereinafter), (7) an N,N-dialkylallylamine polymer having a recurring unit of the above general formula (II), having a weight average molecular weight, measured by gel permeation chromatography using polyethylene oxide as a reference, of 250 to 3,000 and having an ignition residue content of 5% by weight or less (to be referred to as "Polymer 1" hereinafter), (8) a copolymer of N,N-dialkylallylamine and monoallylamine, which copolymer has recurring units of the above general formulae (IV) and (II), or an addition salt thereof (to be referred to as "Polymer 2 or addition salt thereof" hereinafter), and (9) a copolymer of N,N-dialkylallylamine of the above general formula (I) and N-substituted or non-substituted diallylamine, or an addition salt thereof (to be referred to as "Polymer 3 or addition salt thereof" hereinafter).

BRIEF DESCRIPTION OF DRAWINGS

In FIG. 1, reference numeral 1 shows a starting liquid vessel, 2 shows a concentrated liquid vessel, 3 shows a dilution chamber, 4 shows a concentration chamber, 5 shows an electrode chamber, 6 shows an electrode plate, 7 shows a starting liquid line, 8 shows a concentrated liquid line, 9 shows an electric vessel, $P_1$ and $P_2$ show pumps, respectively, A is an anion exchange membrane, and C shows a cation exchange membrane.

BEST MODES FOR PRACTICING THE INVENTION

Figure 1:
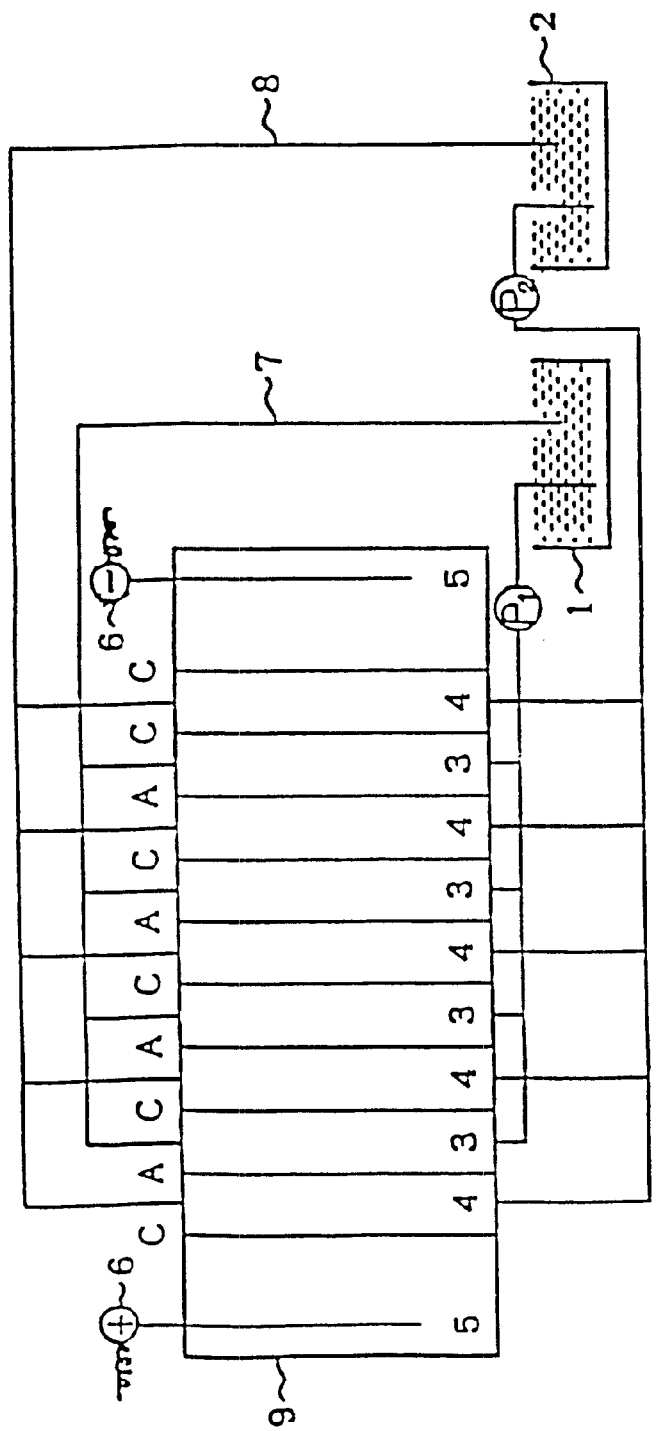
FIG. 1 is a schematic view of an example of an electric dialyzer used in a purification method of the present invention.

Production Process 1 of the present invention will be explained first.

Production Process 1 is a process of polymerizing an addition salt of N,N-dialkylallylamine in an aqueous solvent in the presence of a radical initiator having a molecule containing an azo group or a persulfate radical initiator, to produce an N,N-dialkylallylamine polymer or an addition salt thereof.

In Production Process 1, an N,N-dialkylallylamine of the general formula (I),

wherein each of $R^1$ and $R^2$ is independently an alkyl group having 1 to 4 carbon atoms, is used as the above addition salt of an N,N-dialkylallylamine.

Examples of the above addition salts of N,N-dialkylallylamine of the general formula (I) include addition salts of N,N-dimethylallylamine, N,N-diethylallylamine, N,N-dipropylallylamine and N,N-dibutylallylamine. The addition salt includes hydrochloride, hydrobromic acid salt, sulfate, sulfite and phosphate. These N,N-dialkylallylamine addition salts may be used alone or in combination. In the present invention, when N,N-dimethylallylamine hydrochloride is used, an obtained N,N-dimethylallylamine hydrochloride polymer is soluble in methanol.

In the above process, the polymerization is carried out in an aqueous solvent. The aqueous solvent is selected, for example, from water, inorganic acids (hydrochloric acid, sulfuric acid, phosphoric acid or polyphosphoric acid), an organic acid aqueous solution or an inorganic acid salt (zinc chloride, calcium chloride or magnesium chloride) aqueous solution.

JP-B-6-2780 discloses a process for the production of a low-molecular-weight allylamine polymer, in which it is required to polymerize a monoallylamine in the presence of a large excess of hydrochloric acid while using a catalyst which is used in the present invention.

In the present invention, however, a low-molecular-weight N,N-dialkylallylamine polymer or an addition salt thereof can be produced without particularly using a large excess of an acid. Procedures after the polymerization can be therefore simplified.

In the present invention, the amount of the acid used based on the N,N-dialkylallylamine is preferably 100 to 110 equivalent %. When the amount of the acid used is less than 100 equivalent % based on the N,N-dialkylallylamine, the polymerization rate is liable to be low. When it exceeds 110 equivalent %, a solution of an obtained polymer is liable to be colored in some cases.

In general, the above addition salt of N,N-dialkylallylamine is used in the form of an isolated crystal. The N,N-dialkylallylamine and an acid may be added to the above aqueous solvent to form the addition salt in a system thereof. When an aqueous solution of an acid is used as a polymerization medium, naturally, a predetermined amount of the N,N-dialkylallylamine can be added to the aqueous solution of the acid to polymerize it in situ.

The above process uses a radical initiator having a molecule containing an azo group or a persulfate radical intiator. Examples of the radical initiator having a molecule containing an azo group include those described in JP-B-2-14364, JP-B-2-56361, JP-B-2-56362, JP-B-2-57082 and JP-B-2-57083.

Of those radical polymerization initiators, preferred are those having a molecule containing an azo group and cationic nitrogens, and of those, an inorganic acid or organic acid salt of an azo compound of the general formula (VI) is practically used in view of the relative difficulty in synthesis of a raw material.

$R^5\text{—}N\text{=}N\text{—}R^6$ (VI)

wherein at least one of $R^5$ and $R^6$, preferably both of these, is/are a group or groups containing a cationizable nitrogen atom, selected from the class consisting of aminoalkyl, aminoaryl, amidinylalkyl, amidinylaryl, aminoalkaiyl, aminoaralkyl, amidinoaralkyl, amidinylalkaryl, cyanoaminoalkyl and cyanoaminoalkaryl, when one of $R^5$ and $R^6$ is a group containing a cationizable nitrogen atom, the other is a group selected from the class consisting of alkyl, aryl, alkaryl, aralkyl, cyanoalkyl, cyanoaryl, cyanoalkaryl and cyanoaralkyl, and $R^5$ and $R^6$ may together may form a single alkylene group of the general formula (VII),

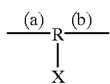

(VII)

wherein R is a group selected from the class consisting of alkylene, alkylalkylene and arylalkylene, covalent bonds (a) and (b) bond to nitrogen atoms of the azo group and form a ring containing the azo group, and X is a group containing a cationizable nitrogen.

Of these, the radical polymerization initiator of the general formula (VI) is particularly preferably a compound having a secondary or tertiary carbon vicinal to the azo group.

Examples of the radical initiator having a molecule containing an azo group (to be sometimes referred to as "azo radical initiator" hereinafter) include 2,2'-diamidinyl-2,2'-azopropane hydrochloride (also called 2,2'-azobis(2-amidinopropane)hydrochloride by another name), 2,2'-diamidinyl-2,2'-azobutane hydrochloride, 2,2'-diamidinyl-2,2'-azopentane hydrochloride, 2,2'-bis(N-phenylamidinyl)-2,2'-azopropane hydrochloride, 2,2'-bis(N-phenylamidinyl)-2,2'-azobutane hydrochloride, 2,2'-bis(N,N-dimethylamidinyl)-2,2'-azopropane hydrochloride, 2,2'-bis(N,N-dimethylamidinyl)-2,2'-azobutane hydrochloride, 2,2'-bis(N,N-diethylamidinyl)-2,2'-azopropane hydrochloride, 2,2'-bis(N,N-diethylamidinyl)-2,2'-azobutane hydrochloride, 2,2'-bis(N,N-di-n-butylamidinyl)-2,2'-azopropanehy drochloride, 2,2'-bis(N,N-di-n-butylamidinyl)-2,2'-azobutane hydrochloride, 3,3'-bis(N,N-di-n-butylamidinyl)-3,3'-azopentane hydrochloride and azobis-N,N'-dimethyleneisobutylamidine hydrochloride.

These hydrochlorides are preferably dihydrochlorides.

Other examples of the radical initiator having a molecule containing an azo group include quaternary ammonium salt type azonitrile prepared by converting 2,2'-azobis[2-(2-imidazolin-2-yl)propane]hydrochloride, 2,2'-azo-bis(2-methyl-4-diethylamino)-butyronitrile hydrochloride, 2,2'-azobis(2-methyl-4-dimethylamino)-butyronitrile hydrochloride, 2,2'-azobis(2-methyl-4-diethylamino)-butyronitrile hydrochloride, 2,2'-azobis(2-ethyl-4-diethylamino)-butyronitrile or 2,2'-azobis(2-methyl-4-dimethylamino)-butyronitrile into a quaternary compound with dimethylsulfuric acid or methyl p-toluenesulfonate; 3,5-diamidinyl-1,2-diazo-1-cyclopentene hydrochloride, 3-methyl-3,4-diamidinyl-1,2-diazo-1-cyclopentene hydrochloride, 3-ethyl-3,5-diamidinyl-1,2-diazo-1-cyclopentene hydrochloride, 3,5-dimethyl-3,5-diamidinyl-1,2-diazo-1-cyclopentene hydrochloride, 3,6-diamidinyl-1,2-diazo-1-cyclohexene hydrochloride, 3-phenyl-3,5-diamidinyl-1,2-diazo-1-cyclopentene hydrochloride, 3,5-diphenyl-3,5-diamidinyl-1,2-diazo-1-cyclopentene hydrochloride; 2,2'-azobis-(2-methyl-propioamidoxime), 2,2'-azobis-(2-methyl-propion-hydroxamic acid), 2,2'-azobis-(2-methyl-butyroamidoxime), 2,2'-azobis-(2-methyl-butylhydroxamic acid), 2,2'-azobis-(2-isobutyl-2-methyl-propioamidoxime), 2,2'-azobis-(2-isobutyl-2-methyl-propion-hydroxamic acid), 2,2'-azobis-(2-cyclohexyl-propioamidoxime), 2,2'-azobis-(2-cyclohexyl-propion-hydroxamic acid), 2,2'-azobis-(2-phenyl-propioamidoxime), 2,2'-azobis-(2-phenyl-propion-hydroxamic acid), 2,2'-azobis-(2-benzyl-propioamidoxime), 2,2'-azobis-(2-benzyl-propion-hydroxamic acid), 1,1'-azobis-(cyclohexyl-carboamidoxime), 1,1'-azobis-(cyclohexyl-carbohydroxamic acid); 2,2'-azobis-(2-carboxymethyl-propioamidoxime), 2,2'-azobis-(2-carboxyethyl-propioamidoxime), 3,3'-azobis-(3-carboxyethyl-butyroamidoxime), 2,2'-azobis-(2-carboxymethyl-propionhydroxamic acid), 2,2'-azobis-(2-carboxyethyl-propionhydroxamic acid), 3,3'-azobis-(3-carboxyethyl-butylhydroxamic acid); 2,2'-azobis-(2-methylpropionic acid methyl ester), 2,2'-azobis-(2-methylpropionic acid ethyl ester), 2,2'-azobis-(2-ethylpropionic acid methyl ester), 2,2'-azobis-(2-ethylbutyric acid methyl ester), 2,2'-azobis-(2-acetoxy-propane), 2,2'-azobis-(2-acetoxy-butane), 1,1'-azobis(1-formoxy-cyclohexane); 2,2'-azobis-(2-methylpropionic acid hydrazide), 2,2'-azobis-(2-methylbutyric acid hydrazide), 2,2'-azobis-(2-ethylbutyric acid hydrazide), 1,1'-azobis-(1-cyclohexylcarboxylic acid hydrazide), 4,4'-azobis-( 4-hydroxyvaleric acid hydrazide), and 4,4'-azobis-(4-hydroxycaproic acid hydrazide).

The above azo-containing radical initiators may be used alone or in combination.

As will be shown in Comparative Example to be described later, when it is attempted to carry out the polymerization under similar conditions in the presence of tert-butylhydroxyperoxide or hydrogen peroxide which are known as radical polymerization initiators, in place of the radical polymerization initiator having a molecule containing an azo group, almost no polymerization proceeds.

The persulfate can be selected, for example, from ammonium persulfate, sodium persulfate or potassium persulfate. These sulfates may be used alone or in combination.

In the above process, the amount of the above radical initiator based on the addition salt of N,N-dialkylallylamine is in the range of from 2 to 100 mol %. When the above amount is less than 2 mol %, impractically, the polymerization rate is low. When it exceeds 100 mol %, it is difficult to produce a polymer having a desired molecular weight, and such an amount is disadvantageous in economic performance. The above amount is preferably in the range of from 5 to 100 mol %, more preferably 7 to 50 mol %, still more preferably 10 to 40 mol %. The above radical initiator may be divided into some portions to add them a plurality of times, one in one time and another after some time.

It is particularly advantageous to use the azo-containing radical initiator in the above amount range, since a polymer colored to a less degree can be obtained.

The polymerization temperature differs depending upon an aqueous solvent used and a radical polymerization initiator used. When the azo-containing radical initiator is used, it is generally 55° C. to a reflux temperature, preferably 55 to 100° C.

When the polymerization temperature does not exceed 55° C., the polymerization does not easily take place, so that the polymerization rate is liable to be low. When the polymerization temperature exceeds 100° C., a polymerization solution is colored in brown, etc., in some cases.

When the persulfate radical initiator is used, the polymerization temperature is generally 30° C. to a reflux temperature, preferably 40 to 90° C., still more preferably 50 to 70° C. In this case, unexpectedly, the polymerization takes place at a high polymerization rate at a low polymerization degree even at a low temperature of 50 to 70° C. When the polymerization temperature is too high, the polymerization does not easily take place, so that the polymerization rate is liable to be low. When it is too high, the polymerization solution is liable to be colored in brown, and the like.

The time period for the polymerization is influenced by the polymerization temperature and the type and amount of the radical polymerization initiator and therefore cannot be determined uniformly, while it is generally 150 hours or less.

Concerning a starting monomer concentration, a higher concentration of the starting monomer within the solubility range thereof is preferred, while it is generally at least 30% by weight, preferably 50 to 90% by weight.

When it is intended to produce the addition salt of an N,N-dialkylallylamine polymer in the form of a solid, for example, there may be employed a method in which a reaction mixture is poured into a solvent for precipitation without neutralizing the reaction mixture and a precipitated solid is recovered by means of filtration, or the like. In this case, it is essential to select a kind and an amount of the solvent for precipitation such that the solvent for the precipitation is dissolved in a solvent used for the polymerization and that a mixture formed by mixing the solvent used for the polymerization with the solvent for precipitation substantially does not dissolve an addition salt of the end polymer. As a solvent for precipitation, a mixture of a plurality of solvents may be used. For example, when the addition salt of N,N-dialkylallylamine polymer is an N,N-dimethylallylamine hydrochloride polymer, acetone:isopropanol 1:1 (weight ratio) mixed solvents may be used as a solvent for precipitation.

The addition salt of N,N-dialkylallylamine polymer that is recovered can be purified by washing it with a proper solvent such as the above solvent for precipitation, and then drying it.

The N,N-dialkylallylamine hydrochloride polymer obtained in the present invention is water-soluble after the polymerization.

When it is intended to produce a free N,N-dialkylallylamine polymer, for example, a reaction mixture after the polymerization is neutralized with a proper alkali such as sodium hydroxide, to give the free N,N-dialkylallylamine polymer.

In the above manner, there can be obtained an N,N-dialkylallylamine polymer having a recurring unit of the general formula (II),

wherein $R^1$ and $R^2$ are as defined above, or an addition salt thereof.

The free N,N-dialkylallylamine polymer is water-soluble when both $R^1$ and $R^2$ in the above general formula (II) are $CH_3$. As the numbers of carbon atoms of the alkyl groups represented by $R^1$ and $R^2$ increase, the solubility of the N,N-dialkylallylamine polymer in water decreases. When the above N,N-dialkylallylamine polymer which is in a free state and has poor solubility in water is used in a water-based system, the water solubility of the polymer can be increased by forming a proper proportion of dialkylamino groups into addition salts.

In the present invention, the addition salt of N,N-dialkylallylamine polymer includes not only a complete addition salt of N,N-dialkylallylamine polymer such as N,N-dialkylallylamine hydrochloride polymer, but also a partial addition salt of N,N-dialkylallylamine polymer.

An aqueous solution of the above-obtained N,N-dialkylallylamine polymer or addition salt thereof is colored to some extent.

When it is intended to particularly produce an N,N-dialkylallylamine polymer or an addition salt thereof, which is purified and improved in coloring, Production Process 2 which will be described below can be carried out.

In Production Process 2 of the present invention, the polymerization solution obtained in the above Production Process 1 is neutralized to bring a formed polymer into a free state, then, a residual monomer is distilled off under reduced pressure, and then the remaining polymerization solution is subjected to ion exchange membrane electrodialysis to purify the polymerization solution, whereby a purified free N,N-dialkylallylamine polymer can be obtained. An addition salt thereof can be obtained by treating the purified free N,N-dialkylallylamine polymer with an acid which is to constitute a desired addition salt.

Even if the solution obtained immediately after the polymerization is subjected to ion exchange membrane electrodialysis as described in JP-B-7-68298, it is difficult to overcome the coloring, and it is difficult to remove a salt. Therefore, the solution after the polymerization is neutralized with an alkali first. Preferably, the neutralization is carried out to such an extent that the N,N-dialkylallylamine polymer is brought into a complete free state. The neutralized aqueous solution generally has a pH of 9 to 13.5, preferably 10 to 13.

Further, after the complete neutralization, a monomer remaining in the neutralized polymer solution is distilled off under reduced pressure. In this case, the polymer as an end product can be retained without being distilled off. When the residual monomer is distilled off, the distillation is preferably carried out at an external temperature of 40 to 100° C. at 10 to 300 mmHg, more preferably at an external temperature of 50 to 80° C. at 20 to 200 mmHg.

When the solution is subjected to ion exchange membrane electrodialysis after the removel of the monomer, the solution may be diluted with water before it is subjected to ion exchange membrane electrodialysis since part of water is distilled off during the distillation of the monomer off. In this case, the polymer as an end product remains almost without being removed by the ion exchange membrane electrodialysis, and the polymer solution is improved in coloring. Further, impurites derived from the radical polymerization initiator used in a large amount for the polymerization and a salt formed by the neutralization can be also removed together.

A working embodiment of the ion exchange membrane electrodialysis used in Production Process 2 will be explained below with reference to an attached drawing.

FIG. 1 is a schematic view of one example of an electric dialyzer used for the purification of the polymer in Process of the present invention. An electric vessel 9 has cation exchange membranes C and anion exchange membranes A which are arranged alternately in parallel with one another, and it is constituted of dilution chambers 3, concentration chambers 4 and electrode chambers 5 which are partitioned with the membranes. Electrode chambers 5 on both ends of the electric vessel 9 are provided with an anode or cathode electrode plate 6. A starting liquid (polymerization solution after the monomer is distilled off) charged into a starting liquid vessel 1 is sent to the dilution chambers 3 of the electric vessel 9 with a pump $P_1$. Then, coloring components, etc., move to the concentration chambers 4 through the cation exchange membranes C or the anion exchange membranes A. During the movement, the N,N-dialkylallylamine polymer is blocked with each cation exchange membrane C and therefore remains in the dilution chambers 3, and as it is, it remains in a state where it is improved in coloring. On the other hand, an electrolyte which is a concentrated liquid is charged into the concentrated liquid vessel 2 and the electrode chambers 5. The concentrated liquid is sent to the concentration chamber 4 with a pump $P_2$.

Specifically, the starting liquid, the concentrated liquid and an electrode liquid are recycled to the dilution chambers 3, the concentration chambers 4 and the electrode chambers 5, respectively, and DC voltage is applied between the electrode plates 6, whereby impurities are gradually removed from the starting liquid charged into the starting liquid vessel 1 by dialysis, and impurties dialyzed in the concentrated liquid are concentrated in the concentrated liquid vessel 2. As a result, a purified polymer solution comes to be stored in the starting liquid vessel 1, and the impurities come to be concentrated and stored in the concentrated liquid vessel 2. In this case, impurities derived from the neutralization salt or the radical polymerization initiator are concentrated and stored in the concentrated liquid vessel together.

In this manner, there can be obtained an aqueous solution of an N,N-dialkylallylamine polymer which is improved in coloring and from which impurities derived from the neutralization salt or the radical initiator are removed.

The cation exchange membrane and the anion exchange membrane used in this case can be selected from general ion exchange membranes (e.g., CMV, AMV, etc., supplied by Asahi Glass Co., Ltd.), and it is not necessary to use any special ion exchange membranes. Further, the electrodialysis vessel in which these ion exchange membranes are fitted can be also selected from commercially available ones, and it is not necessary to particularly determine the membrane/membrane distance or the number of the chambers.

When the N,N-dialkylallylamine polymer is so purified, the ignition residue content can be decreased to 5% by weight or less, preferably 2% by weight or less, more preferably 0.5% by weight or less, and the residual monomer content can be decreased to 250 ppm by weight or less.

In the present invention, there can be produced an N,N-dialkylallylamine polymer having a relatively low polymerization degree or an addition salt thereof. Although differing depending upon reaction conditions, the weight average molecular weight of a polymer that can be obtained is generally 250 to 3,000 as a free polymer. In the present specification, the "weight average molecular weight" refers to a weight average molecular weight determined by gel permeation chromatography (GPC) using polyethylene oxide as reference.

In the present invention, a polymer having a low polymerization degree can be obtained by setting the monomer concentration at a low level, setting the polymerization temperature at a high temperature and setting the radical polymerization initiator concentration at a high level.

When an acid such as hydrochloric acid is added to the thus-obtained N,N-dialkylallylamine polymer aqueous solution, a purified aqueous solution of addition salt of N,N-dialkylallylamine polymer can be obtained. In some cases, the obtained aqueous solution is concentrated as required, placed in a proper polar solvent such as an acetone-isopropanol 1:1 (weight ratio) mixed solvents to form a precipitate, and the formed precipitate is recovered by filtration, whereby the addition salt of N,N-dialkylallylamine polymer can be obtained in the form of a solid.

The N,N-dialkylallylamine polymer or the addition salt thereof, obtained in Production Process 1 or 2, is useful for various uses in the field of fine chemicals, and for example, it can be used as a water-resistance-imparting agent for an inkjet ink. The purified and free N,N-dialkylallylamine polymer obtained in Production Process 2 is particularly useful for an inkjet ink since it is characteristic features that it is less colored, has its ignition residue content decreased and does not easily corrode metals.

Further, it has been found that the above N,N-dialkylallylamine polymer or the salt thereof includes some N,N-dialkylallylamine polymers or their salts which exhibit thermal-sensitive thermally reversible properties. For example, when a purified and free N,N-dimethylallylamine polymer obtained according to Production Process 2 is mixed with water, the mixture becomes cloudy at a high temperature (45° C. or higher) and is transparent at a low temperature (clouding point: 43.5° C., nearly transparent at 42° C.). A novel use thereof can be developed as a thermal-sensitive thermally reversible material.

Production Process 3 of the present invention will be explained hereinafter.

Production Process 3 is a process of copolymerizing an addition salt of a monoallylamine and an addition salt of an N,N-dialkylallylamine in an aqueous solvent in the presence of a radical initiator having a molecule containing an azo group or a persulfate radical initiator to produce a copolymer of N,N-dialkylallylamine and monoallylamine or an addition salt thereof.

Production Process 3 uses, as a monoallylamine, an addition salt of a compound of the general formula (III),

(III)

wherein $R^3$ is a hydrogen atom or an alkyl group having 1 to 4 carbon atoms.

Examples of the addition salt of the compound of the general formula (III) include addition salts of monoallylamine, N-methylmonoallylamine, N-ethylmonoallylamine, N-propylmonoallylamine and N-butylmonoallylamine. Examples of the addition salt include hydrochloride, hydrobromic acid salt, sulfate, sulfite and phosphate.

As an addition salt of an N,N-dialkylallylamine, an addition salt of the compound of the already described general formula (I) is used, which is as explained in Production Process 1.

In the present invention, the above addition salts of monoallylamine may be used alone or in combination, and the addition salts of the N,N-dialkylallylamine may be used alone or in combination.

In the above process, the polymerization is carried out in an aqueous solvent, which is as explained in Production Process 1.

As described already, as a process for the production of a low-molecular-weight allylamine polymer, JP-B-6-2780 discloses that, when a low-molecular-weight monoallylamine polymer is produced from a monoallylamine while using an azo-group-possessing radical polymerization initiator which is used in the present invention, it is required to carry out polymerization in the presence of a large excess of hydrochloric acid.

In the present invention, however, an N,N-dialkylallylamine/monoallylamine copolymer having a low molecular weight or an addition salt thereof can be produced even without particularly using a large excess of an acid.

When the polymerization is carried out, generally, the above addition salt of a monoallylamine or the above addition salt of the N,N-dialkylallylamine is used in the form of an isolated crystal. However, the monoallylamine, the N,N-dialkylallylamine and an acid may be added to the above aqueous solvent to form the addition salts in the system.

In the above case, the amount of the acid which is added to the monomers for forming the addition salts of the monomers is preferably 100 to 110 equivalent % based on the total amount of the monomers used. When the amount of the acid based on the N,N-dialkylallylamine is less than 100 equivalent %, the polymerization rate may be low in some cases. When it exceeds 110 equivalent %, a colored polymer solution is liable to be obtained.

When an aqueous solution of the acid is used as a polymerization medium, naturally, a predetermined amount of the monoallylamine and a predetermined amount of the N,N-dialkylallylamine can be added to the aqueous solution of the acid and polymerized in situ.

In the polymerization, the molar ratio of the addition salt of the N,N-dialkylallylamine and the addition salt of the monoallylamine is preferably in the range of from 10:90 to 90:10, more preferably in the range of from 20:80 to 80:20.

In the above process, a radical initiator having a molecule containing an azo group or a persulfate radical initiator is used as a polymerization catalyst. These are as explained in Production Process 1.

When the azo-containing radical initiator is used as a radical initiator, desirably, a copolymer which is not much colored is obtained. In this case, further, an inorganic acid salt such as zinc chloride may be added in addition to the azo-containing radical initiator.

As will be shown in Comparative Example to be described later, even if the polymerization is carried out under similar conditions in the presence of any one of tert-butylhydroxyperoxide, hydrogen peroxide, etc., which are known as radical polymerization initiators, almost no polymerization proceeds.

In the present invention, it is preferred to use the radical polymerization initiator in a large amount as compared with general polymerizations. In general, the amount of the radical polymerization initiator based on the total monomer amount is generally 2 to 100 mol %, preferably 5 to 100 mol %, more preferably 7 to 50 mol %, particularly preferably 10 to 40 mol %. When the amount of the radical polymerization initiator is small, the polymerization rate is liable to be poor.

Although differing depending upon a reaction solvent used, the polymerization temperature is generally 55° C. to a reflux temperature, preferably 55 to 100° C., more preferably 55 to 80° C.

When the polymerization temperature is lower than 55° C., the polymerization does not easily take place, so that the polymerization rate is liable to be low. When it exceeds 100° C., a polymerization solution may be colored in brown, etc., in some cases.

The time period for the polymerization is influenced by the polymerization temperature and a kind and an amount of the radical polymerization initiator and therefore cannot be uniformly determined. Generally, a time period of within 300 hours is sufficient.

Concerning a monomer concentration in the polymerization, a higher concentration of the starting monomers within the solubility range thereof is preferred, while it is generally at least 40% by weight, preferably 50 to 90% by weight.

Being somewhat hampered by oxygen in air, it is preferred to carry out the polymerization in an inert gas such as nitrogen.

Although differing depending upon reaction conditions, the weight average molecular weight of the thus-obtained addition salt of the copolymer is 250 to 3,000 as a free copolymer.

In the present invention, a copolymer having a lower molecular weight is obtained by decreasing the monomer concentration, increasing the polymerization temperature and increasing the radical polymerization initiator concentration.

When it is intended to produce the addition salt of copolymer of N,N-dialkylallylamine and monoallylamine in the form of a solid, for example, there can be employed procedures of pouring the reaction mixture into a solvent for precipitation to precipitate a solid in stead of neutralizing the reaction mixture and recovering the solid by means such as filtration. In this case, it is essential to determine a kind and an amount of the solvent for precipitation such that the solvent is dissolved in the polymerization solvent and that mixed solvents formed by mixing the polymerization solvent and the solvent for precipitation substantially do not dissolve the addition salt of the copolymer as an end product. The solvent for precipitation may be a mixture of a plurality of solvents. For example, when the addition salt of the copolymer as an end product is a copolymer of monoallylamine hydrochloride and N,N-dimethylallylamine hydrochloride, isopropanol-acetone 1:1 (weight ratio) mixed solvents can be selected as a solvent for precipitation.

The copolymer of monoallylamine hydrochloride and N,N-dialkylallylamine hydrochloride, produced in the present invention, is generally water-soluble and is dissolved in methanol as well after completion of the polymerization.

When it is intended to produce a free copolymer of N,N-dialkylallylamine and monoallylamine, for example, the copolymer of N,N-dialkylallylamine and monoallylamine can be obtained by neutralizing the reaction mixture from the completed polymerization with a proper alkali such as sodium hydroxide.

In the above manner, there can be obtained the copolymer of N,N-dialkylallylamine and monoallylamine, which copolymer has recurring units of the general formulae (IV) and (II),

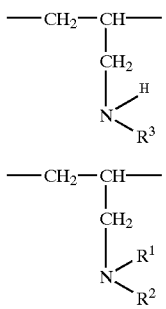 (IV)

(II)

wherein $R_1$, $R_2$ and $R_3$ are as defined above.

The free copolymer of N,N-dialkylallylamine and monoallylamine is water-soluble when both $R^1$ and $R^2$ of the above general formula (II) are $CH_3$. As the numbers of carbon atoms of the alkyl groups represented by $R^1$ and $R^2$ increase, and as the amount of the N,N-dialkylallylamine charged increases, the solubility of the copolymer in water decreases in some cases.

When the above copolymer which is in a free state and has poor solubility in water is used in a water-based system, the water solubility of the polymer can be increased by forming a proper proportion of amino groups in the polymer into addition salts.

In the present specification, the addition salt of the copolymer of N,N-dialkylallylamine and monoallylamine includes not only a copolymer of which the amino groups (including dialkylamino groups) are completely converted to salts such as a copolymer of monoallylamine hydrochloride and N,N-dialkylallylamine hydrochloride, but also a partial neutralization salt thereof and a partial addition salt of the copolymer.

An aqueous solution of the thus-obtained copolymer or addition salt thereof is colored to some extent.

When it is intended to particularly produce a copolymer of N,N-dialkylallylamine and monoallylamine or an addition salt thereof, which is purified and improved in coloring degree, Production Process 4 which will be described below can be carried out.

In Production Process 4 of the present invention, the polymerization solution obtained in the above Production Process 3 is neutralized to bring the formed copolymer into a free state, then, residual monomers are distilled off under reduced pressure, and then the remaining polymerization solution is subjected to ion exchange membrane electrodialysis to purify the polymerization solution, whereby a purified copolymer of N,N-dialkylallylamine and monoallylamine can be obtained. An addition salt thereof can be obtained by treating the purified free copolymer of N,N-dialkylallylamine and monoallylamine-with an acid which is to constitute a desired addition salt.

In Production Process 4, the neutralization of the polymerization solution from the completed polymerization, the distillation of the residual monomer off and the procedures of the ion exchange membrane electrodialysis are as explained with regard to Production Process 2.

When the copolymer of N,N-dialkylallylamine and monoallylamine is so purified, the ignition residue content can be decreased to 5% by weight or less, preferably 2% by weight or less, more preferably 0.5% by weight or less, and the residual monomer content can be decreased to 250 ppm by weight or less.

When an acid such as hydrochloric acid is added to the thus-obtained aqueous solution of the copolymer of N,N-dialkylallylamine and monoallylamine, a purified aqueous solution of addition salt of the copolymer of N,N-dialkylallylamine and monoallylamine can be obtained. In some cases, the obtained aqueous solution is concentrated as required, placed in a proper polar solvent such as an acetone-isopropanol 1:1 (weight ratio) mixed solvents to form a precipitate, and the formed precipitate is recovered by filtration, whereby the addition salt of the copolymer of N,N-dialkylallylamine and monoallylamine can be obtained in the form a solid.

The copolymer of N,N-dialkylallylamine and monoallylamine or the addition salt thereof, obtained in Production Process 3 or 4, is useful for various uses in the field of fine chemicals, and for example, it can be used as a water-resistance-imparting agent for an inkjet ink. The purified and free copolymer of N,N-dialkylallylamine and monoallylamine, obtained in Production Process 4, is particularly useful for an inkjet ink since it is characteristic features that it is less colored, has its ignition residue content decreased and does not easily corrode metals.

Production Process 5 will be explained hereinafter.

Production Process 5 is a process of copolymerizing an addition salt of an N,N-dialkylallylamine and an addition salt of an N-substituted or non-substituted diallylamine in an aqueous solvent in the presence of a radical initiator having a molecule containing an azo group or a persulfate radical initiator to produce a copolymer of N,N-dialkylallylamine and N-substituted or non-substituted diallylamine or an addition salt thereof.

In Production Process 5, as an addition salt of an N,N-dialkylallylamine, there is used an addition salt of a compound of the already described general formula (I), which is as explained in Production Process 1.

As an addition salt of the N-substituted or non-substituted diallylamine, for example, there is preferably used an addition salt of a compound of the general formula (V), in view of the solubility of a copolymer to be obtained in water.

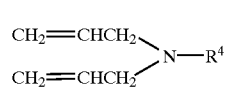 (V)

wherein $R^4$ is a hydrogen atom or an alkyl group having 1 to 3 carbon atoms, which alkyl group may contain a hydroxyl group.

When a persulfate is used as a radical polymerization initiator, it is preferred to use a compound of the above general formula (V) in which $R^4$ is an alkyl group having 1 to 3 carbon atoms, which alkyl group may has an OH group, in view of copolymerizability.

Specific examples of the addition salt of the N-substituted or non-substituted diallylamine include addition salts of non-substituted diallylamine (to be sometimes simply described as "diallylamine" hereinafter), N-methyldiallylamine, N-ethyldiallylamine, N-propyldiallylamine, N-(2-hydroxyethyl)diallylamine, N-(2-hydroxypropyl)diallylamine and N-(3-hydroxypropyl) diallylamine. Examples of the addition salt include hydrochloride, hydrobromic acid salt, sulfate, sulfite and phosphate.

In the present invention, the above addition salts of the N,N-dialkylallylamines may be used alone or in combination. The above addition salts of the N-substituted or non-substituted diallylamines may be used alone or in combination.

In the above process, the polymerization is carried out in an aqueous solvent, and the aqueous solvent is as explained with regard to the already described Production Process 1.

When the polymerization is carried out, generally, the above addition salts of the monomers are used in the form of isolated crystals. However, the above monomers or aqueous solution(s) of the monomers and an acid may be added to the above aqueous solvent to form the addition salts in the system. When an acid aqueous solution is used as a polymerization medium, naturally, a predetermined amount of the N,N-dialkylallylamine, a predetermined amount of the N-substituted or non-substituted diallylamine and the acid aqueous solution can be mixed and polymerized in situ.

As described already, as a process for the production of a low-molecular-weight allylamine polymer, JP-B-6-2780 discloses that, when a low-molecular-weight allylamine polymer is produced from a monoallylamine while using an azo-group-possessing radical polymerization initiator, it is required to carry out polymerization in the presence of a large excess of hydrochloric acid.

In the present invention, however, a low-molecular-weight copolymer of N,N-dialkylallylamine and N-substituted or non-substituted diallylamine can be produced even without particularly using a large excess of an acid.

In the present invention, the amount of the acid which is added to the monomers for forming the addition salts of the monomers is preferably 100 to 110 equivalent % based on the total amount of the monomers used. When the amount of the acid based on the total monomer amount is less than 100 equivalent %, the polymerization rate is liable to be low. When it exceeds 110 equivalent %, a colored polymer solution is liable to be obtained.

Concerning the amount ratio of the N,N-dialkylallylamine and the N-substituted or non-substituted diallylamine used for the polymerization, preferably, the amount of the N-substituted or non-substituted diallylamine is equimolar to, or smaller than, the amount of the N,N-dialkylallylamine, since an obtained copolymer is easily water-soluble when it is in a free state.

In the present invention, as the amount ratio of the N,N-dialkylallylamine increases, an obtained copolymer is likely to have a lower molecular weight.

The above process uses, as a polymerization catalyst, a radical initiator having a molecule containing an azo group or a persulfate radical initiator, which are as explained in Production process 1.

When an azo-containing radical initiator is used as a radical initiator, desirably, a copolymer which is not much colored is obtained. In this case, further, an inorganic acid salt such as zinc chloride may be added in addition to the azo-containing radical initiator.

As will be shown in Comparative Example to be described later, even if the polymerization is carried out under similar conditions in the presence of any one of tert-butylhydroxyperoxide, hydrogen peroxide, etc., which are known as radical polymerization initiators, almost no polymerization proceeds.

In the present invention, it is preferred to use the radical polymerization initiator in a large amount as compared with general polymerizations. In general, the amount of the radical polymerization initiator based on the total monomer amount is generally 2 to 100 mol %, preferably 5 to 100 mol %, more preferably 7 to 50 mol %, particularly preferably 10 to 40 mol %. When the amount of the radical polymerization initiator is small, the polymerization rate is liable to be poor. The above radical polymerization initiator may be divided into some portions to add them a plurality of times, one in one time and another after some time.

Although differing depending upon a reaction solvent used, the polymerization temperature is generally 55° C. to a reflux temperature, preferably 55 to 100° C., more preferably 55 to 80° C.

When the polymerization temperature is too low, the polymerization does not easily take place, so that the polymerization rate is liable to be low. When it is too high, a polymerization solution may be colored in brown, etc., in some cases.

The time period for the polymerization is influenced by the polymerization temperature and a kind and an amount of the radical polymerization initiator and therefore cannot be uniformly determined. Generally, a time period of within 300 hours is sufficient.

Concerning a monomer concentration in the polymerization, a higher concentration within the solubility range of the monomers is preferred, while it is generally at least 40% by weight, preferably 50 to 90% by weight.

Being somewhat hampered by oxygen in air, it is preferred to carry out the polymerization in an inert gas such as nitrogen.

In the copolymer after completion of the polymerization, amino groups are present in a state of addition salts. Although differing depending upon reaction conditions, the weight average molecular weight of the thus-obtained addition salt of the copolymer is generally 250 to 3,000 as a free copolymer.

In the present invention, a copolymer having a lower molecular weight is obtained by decreasing the monomer concentration, increasing the polymerization temperature and increasing the radical polymerization initiator concentration.

When it is intended to produce the addition salt of copolymer of N,N-dialkylallylamine and N-substituted or non-substituted diallylamine in the form of a solid, for example, there can be employed procedures of pouring the reaction mixture into a solvent for precipitation to precipitate a solid in stead of neutralizing the reaction mixture and recovering the solid by means such as filtration. In this case, it is essential to determine a kind and an amount of the solvent for precipitation such that the solvent is dissolved in the polymerization solvent and that mixed solvents formed by mixing the polymerization solvent and the solvent for precipitation substantially do not dissolve the addition salt of the polymer as an end product. The solvent for precipitation may be a mixture of a plurality of solvents. For example, acetone-isopropanol mixed solvents in a proper mixing ratio are preferred.

The addition salt of the copolymer, produced in the present invention, is generally water-soluble after the completion of polymerization. Further, it generally has a higher solubility in an organic solvent than an addition salt of an allylamine homopolymer (polyallylamine).

When it is intended to produce a free copolymer, for example, the free copolymer can be obtained by neutralizing the reaction mixture from the completed polymerization with a proper alkali such as sodium hydroxide.

In the above manner, there can be obtained a copolymer having an N,N-dialkylallylamine unit of the general formula (II),

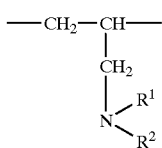
(II)

wherein $R^1$ and $R^2$ are as defined above, and an N-substituted or non-substituted diallylamine unit, for example, of the general formula (VIII) or (IX),

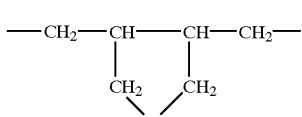
(VIII)

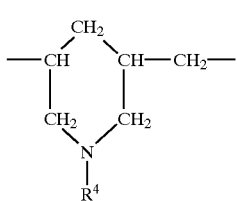
(IX)

wherein $R^4$ is as defined above, or an addition salt thereof.

The free copolymer is likely to be easily soluble in water when the number of carbon atoms of substituents represented by each of $R^1$, $R^2$ and $R^4$ in the above general formulae (II), (VIII) and (IX) is small, and it is likely to have poor solubility in water when the above number of carbon atoms is large.

When the above copolymer which is in a free state and has poor solubility in water is used in a water-based system, the water solubility of the polymer can be increased by forming a proper proportion of amino groups of the copolymer into addition salts.

In the present specification, the addition salt of the copolymer includes not only a copolymer of which the amino groups are completely converted to salts such as a copolymer of N,N-dialkylallylamine hydrochloride and N-substituted or non-substituted diallylamine hydrochloride, but also a partial addition salt of the copolymer and a partial neutralization salt thereof.

An aqueous solution of the thus-obtained copolymer or addition salt thereof is colored to some extent. When it is intended to particularly produce a copolymer of N,N-dialkylallylamine and N-substituted or non-substituted diallylamine or an addition salt thereof, which is purified and improved in coloring degree, Production Process 6 which will be described below can be carried out.

In Production Process 6 of the present invention, the polymerization solution obtained in the above Production Process 5 is neutralized to bring the formed copolymer into a free state, then, residual monomers are distilled off under reduced pressure, and then the remaining polymerization solution is subjected to ion exchange membrane electrodialysis to purify the polymerization solution, whereby a purified copolymer of N,N-dialkylallylamine and N-substituted or non-substituted diallylamine can be obtained.

An addition salt thereof can be obtained by treating the purified above free copolymer with an acid which is to constitute a desired addition salt.

In Production Process 6, the neutralization of the polymerization solution after completion of the polymerization, the distillation of the residual monomers off and the procedures of the ion exchange membrane electrodialysis are as explained with regard to Production Process 2.

When the copolymer of N,N-dialkylallylamine and N-substituted or non-substituted diallylamine is so purified, the ignition residue content can be decreased to 5% by weight or less, preferably 2% by weight or less, more preferably 0.5% by weight or less, and the residual monomer content can be decreased to 250 ppm by weight or less.

When an acid such as hydrochloric acid is added to the thus-obtained aqueous solution of the copolymer of N,N-dialkylallylamine and N-substituted or non-substituted diallylamine, a purified aqueous solution of addition salt of the copolymer of N,N-dialkylallylamine and N-substituted or non-substituted diallylamine can be obtained. In some cases, the obtained aqueous solution is concentrated, placed in a proper polar solvent such as an acetone-isopropanol 1:1 (weight ratio) mixed solvents as required to form a precipitate, and the formed precipitate is recovered by filtration, whereby the addition salt of the copolymer can be obtained in the form a solid.

The copolymer of N,N-dialkylallylamine and N-substituted or non-substituted diallylamine or the addition salt thereof, obtained in Production Process 5 or 6, is useful for various uses in the field of fine chemicals, and for example, it can be used as a water-resistance-imparting agent for an inkjet ink. The purified and free copolymer of N,N-dialkylallylamine and N-substituted or non-substituted diallylamine, obtained in Production Process 6, is particularly useful for an inkjet ink since it is characteristic features that it is less colored, has its ignition residue content decreased and does not easily corrode metals.

According to the present invention, further, there are also provided polymers 1, 2 and 3.

First, the polymer 1 is an N,N-dialkylallylamine polymer having a recurring unit of the general formula (II),

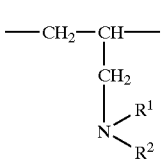
(II)

wherein $R^1$ and $R^2$ are as defined above, having a weight average molecular weight, measured by gel permeation chromatography using polyethylene oxide as a reference, of 250 to 3,000, and having an ignition residue content of 5% by weight or less.

The above N,N-dialkylallylamine polymer preferably has an ignition residue content of 2% by weight or less, particularly preferably 0.5% by weight or less, and a residual monomer content of 250 ppm by weight or less.

The recurring unit of the above general formula (II) contained in the above polymer may constitute a recurring unit of one kind, or it may constitute recurring units of two kinds or more.

The N,N-dialkylallylamine polymer having the above properties can be produced, for example, by the already described Production Process 2.

The above N,N-dialkylallylamine copolymer is useful for various uses in the field of fine chemicals, and for example, it is particularly useful as a water-resistance-imparting agent for an inkjet ink since it is less colored, has its ignition residue content decreased and does not easily corrode metals.

Further, it has been found that the above polymer includes some polymers which exhibit thermal-sensitive thermally reversible properties (e.g., N,N-dimethylallylamine polymer), and they are promising as a novel functional material such as a thermal-sensitive thermally reversible material.

The polymer 2 is a copolymer of N,N-dialkylallylamine and monoallylamine, which copolymer has a recurring unit of the general formula (IV),

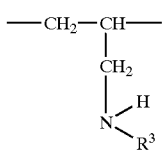

(IV)

wherein $R^3$ is as defined above, and a recurring unit of the general formula (II),

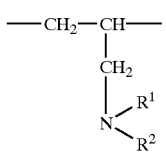

(II)

wherein $R^1$ and $R^2$ are as defined above, or an addition salt thereof.

In the above polymer 2, the molar ratio of the recurring unit of the above general formula (IV) and the recurring unit of the general formula (II) is preferably in the range of from 10:90 to 90:10, particularly preferably in the range of from 20:80 to 80:20.

Further, the recurring unit of the above general formula (IV) contained in the above polymer may constitute a recurring unit of one kind, or it may constitute recurring units of two kinds or more. Further, the recurring unit of the above general formula (II) contained in the above polymer may constitute a recurring unit of one kind, or it may constitute recurring units of two kinds or more.

The above polymer 2 is preferably a copolymer of N,N-dialkylallylamine and monoallylamine, which copolymer has a weight average molecular weight in the range of from 250 to 3,000, an ignition residue content of 5% by weight or less, preferably 2% by weight or less, more preferably 0.5% by weight or less, and a residual monomer content of 250 ppm by weight or less, or an addition salt thereof.

The above polymer 2 can be produced by the already described Production Process 3 or Production Process 4, while it is advantageous to produce the polymer 2 by Production Process 4 from the viewpoint of qualities of the polymer.

The polymer 2 is useful for various uses in the filed of fine chemicals, and for example, it can be used as a water-resistance-imparting agent for an inkjet ink.

The polymer 3 is a copolymer of N,N-dialkylallylamine of the general formula (I),

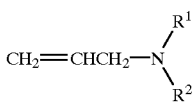

(I)

wherein $R^1$ and $R^2$ are as defined above, and N-substituted or non-substituted diallylamine, or an addition salt thereof.

For the above polymer 3, a compound of the general formula (V),

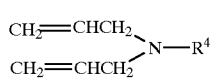

(V)

wherein $R^4$ is as defined above, is preferably used as the above N-substituted or non-substituted diallylamine. When the above monomers are used, the polymer 3 is a copolymer of N,N-dialkylallylamine and N-substituted or non-substituted diallylamine, which copolymer has an N,N-dialkylallylamine unit of the general formula (II),

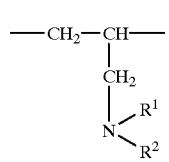

(II)

wherein $R^1$ and $R^2$ are as defined above, and an N-substituted or non-substituted diallylamine unit of the general formula (VIII) or (IX),

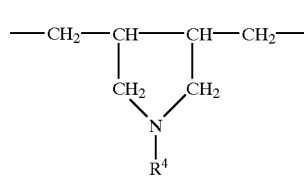

(VIII)

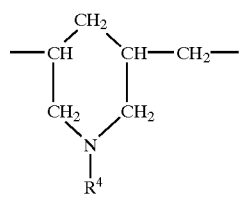

(IX)

wherein $R^4$ is as defined above.

The polymer 3 is preferably a polymer obtained by copolymerizing the N,N-dialkylallylamine and the N-substituted or non-substituted diallylamine in an amount equimolar to, or smaller than, the amount of N,N-dialkylallylamine. Further, N,N-dialkylallylamines may be used alone or in combination, and N-substituted or non-substituted diallylamines may be used alone or in combination.

The above polymer 3 is preferably a copolymer of N,N-dialkylallylamine and N-substituted or non-substituted diallylamine, which copolymer has a weight average molecular weight in the range of from 250 to 3,000 when it is in a free state, an ignition residue content of 5% by weight or less, preferably 2% by weight or less, more preferably 0.5% by weight or less, and a residual monomer content of 250 ppm by weight or less, or an addition salt thereof.

The above polymer 3 can be produced by the already described Production Process 5 or Production Process 6, while it is advantageous to produce the polymer 3 by Production Process 6 from the viewpoint of qualities of the polymer.

The polymer 3 is useful for various uses in the filed of fine chemicals, and for example, it can be used as a water-resistance-imparting agent for an inkjet ink.

The present invention will be explained more in detail with reference to Examples, while the present invention shall not be limited by these Examples.

EXAMPLE 1

Preparation of N,N-dimethylallylamine Hydrochloride Polymer in the Presence of 2,2'-azobis(2-amidinopropane)dihydrochloride as Radical Polymerization Initiator A 100-ml three-necked flask having a stirrer, a thermometer and a reflux condenser was charged with 50.50 g (0.25 mol) of an N,N-dimethylallylamine hydrochloride aqueous solution having an N,N-dimethylallylamine hydrochloride concentration of 60.21 wt %, and the aqueous solution was heated to 60° C. After the temperature came to be constant, 4.34 g (6.4 mol % based on the monomer) of 2,2'-azobis(2-aminidinopropane)dihydrochloride was added as a radical polymerization initiator to initiate polymerization. 24 Hours, 48 hours and 72 hours after the initiation of the polymerization, 2.17 g (3.2 mol % based on the monomer) of 2,2'-azobis(2-amidinopropane)dihydrochloride was added each time as well. Thereafter, the polymerization was further continued for 24 hours.

Then, an obtained yellowish reaction solution was placed in 3 liters of acetone-isopropanol mixed solvents (weight ratio 1 to 1) to precipitate a polymer, and the solution was poured into a glass filter for filtration, followed by fully washing and vacuum drying at 60° C. for 48 hours, to give 22.3 g of the polymer.

Figure 2:
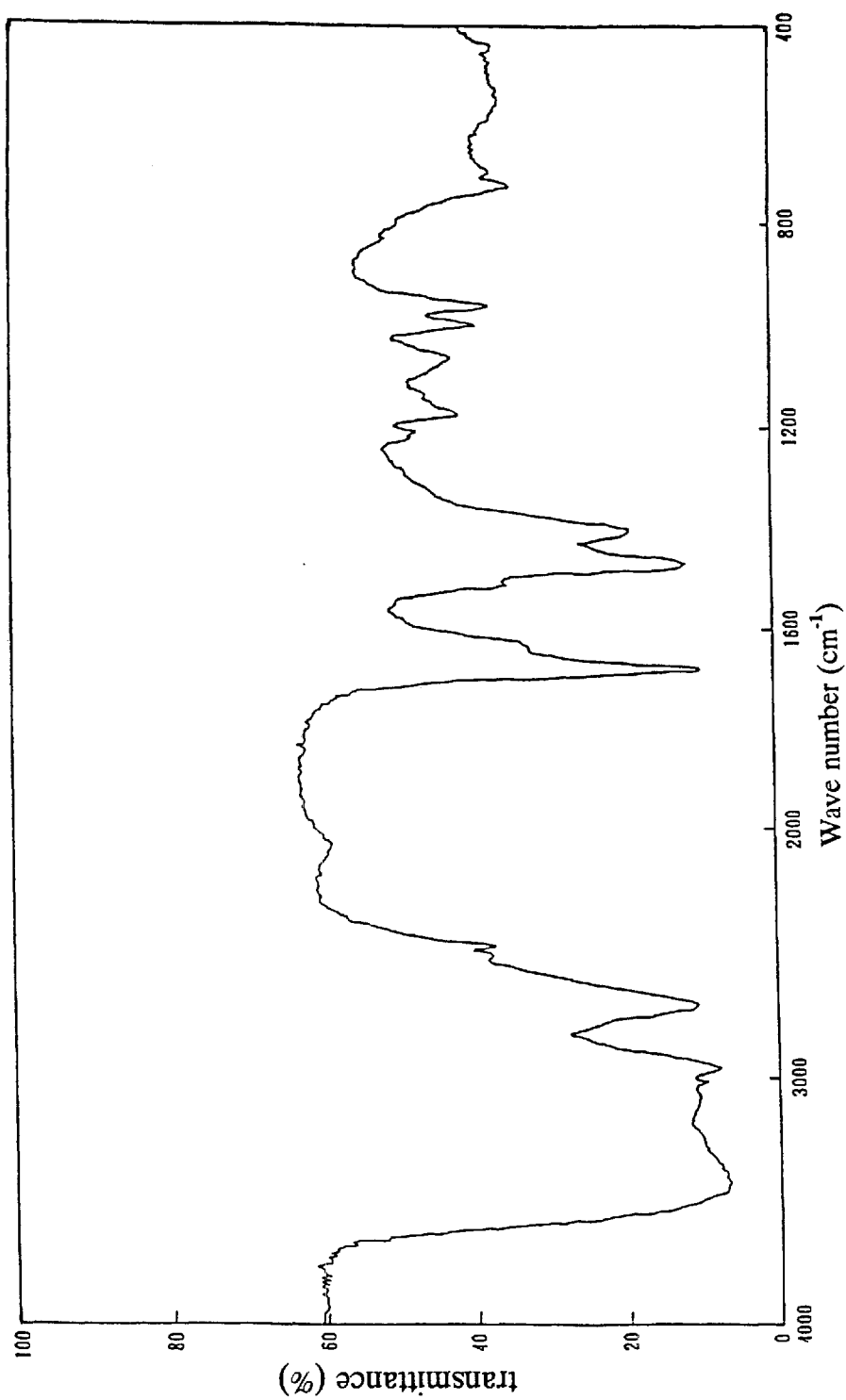
FIG. 2 is an IR spectrum of an N,N-dimethylallylamine hydrochloride polymer obtained in Example 1.

FIG. 2 shows an IR spectrum (KBr method) of the obtained polymer. Absorption at 920 $cm^{-1}$ and 995 $cm^{-1}$, based on out-of-plane deformation vibration derived from hydrogen atoms on C=C double bonds, disappears, which supports that the obtained polymer was an N,N-dimethylallylamine hydrochloride polymer as an end product.

EXAMPLE 2

Preparation of N,N-dimethylallylamine hydrochloride Polymer in the Presence of 2,2'-azobis[2-(2-imidazolin-2-yl)propane] dihydrochloride as Radical Polymerization Initiator An N,N-dimethylallylamine hydrochloride polymer was obtained in the same manner as in Example 1 except that the 2,2'-azobis(2-aminidinopropane)dihydrochloride was replaced with an equimolar amount of 2,2'-azobis[2-(2-imidazolin-2-yl)propane]dihydrochloride.

EXAMPLE 3

Preparation of N,N-diethylallylamine hydrochloride Polymer in the Presence of 2,2'-azobis(2-amidinopropane)dihydrochloride as Radical Polymerization Initiator An N,N-diethylallylamine hydrochloride polymer was obtained in the same manner as in Example 1 except that the N,N-dimethylallylamine hydrochloride was replaced with an equimolar amount of N,N-diethylallylamine hydrochloride.

EXAMPLE 4

Preparation of N,N-dimethylallylamine hydrochloride Polymer in the Presence of ammonium Persulfate as Radical Polymerization Initiator An N,N-dimethylallylamine hydrochloride polymer was obtained in the same manner as in Example 1 except that the 2,2'-azobis(2-aminidinopropane)dihydrochloride was replaced with an equimolar amount of ammonium persulfate.

EXAMPLE 5

Preparation of N,N-diethylallylamine hydrochloride Polymer in the Presence of ammonium persulfate as Radical Polymerization Initiator An N,N-diethylallylamine hydrochloride polymer was obtained in the same manner as in Example 4 except that the N,N-dimethylallylamine hydrochloride was replaced with an equimolar amount of N,N-diethylallylamine hydrochloride.

Comparative Examples 1, 2

Preparation of N,N-dimethylallylamine hydrochloride Polymer in the Presence of tert-butylhydroperoxide or hydrogen peroxide as Radical Polymerization Initiator Example 1 was repeated except that the 2,2'-azobis(2-amidinopropane)dihydrochloride in Example 1 was replaced with an equimolar amount of tert-butylhydroperoxide (Comparative Example 1) or hydrogen peroxide (Comparative Example 2).

[Polymerization Rate, Weight Average Molecular Weight and Coloring Degree of Obtained Polymers]

Table 1 shows polymerization rates (%), weight average molecular weights and coloring degrees of the N,N-dimethylallylamine hydrochloride polymers or N,N-diethylallylamine hydrochloride polymers obtained in Examples 1 to 5 and Comparative Examples 1 and 2.

Polymerization rate data in Table 1 were determined on the basis of weights obtained by a reprecipitation method.

The weight average molecular weight of the hydrochloride polymers were determined on the basis of a GPC method. As columns for the GPC method, Asahi Pack water-based gel permeation type columns GS-220HQ (extrusion limit molecular weight 3,000) and GS-620HQ (extrusion limit molecular weight 2,000,000) were connected in series and used. As an elution solvent in the columns, an aqueous solution having a sodium chloride concentration of 0.4 mol/liter was used.

In the present specification, the weight average molecular weight refers to a weight average molecular weight determined by a GPC method using polyethylene oxide as a reference. Data of the coloring degree were obtained by visually observing reaction solutions after completion of polymerization.

TABLE 1

| | Radical polymerization initiator | Polymerization rate (%) | Weight average molecular weight | Coloring degree |
|---|---|---|---|---|
| Ex. 1 | 2,2'-azobis(2-amidinopropane) dihydrochloride | 73 | 900 | Yellowish color |
| Ex. 2 | 2,2'-azobis[2-(2-imidasolin-2-yl) propane] dihydrochloride | 60 | 1,000 | Yellowish color |
| Ex. 3 | 2,2'-azobis(2-amidinopropane) dihydrochloride | 68 | 500 | Yellowish color |

TABLE 1-continued

|  | Radical polymerization initiator | Polymerization rate (%) | Weight average molecular weight | Coloring degree |
|---|---|---|---|---|
| Ex. 4 | Ammonium persulfate | 61 | 600 | Brown |
| Ex. 5 | Ammonium persulfate | 60 | 400 | Brown |
| CEx. 1 | tert-butylhydro-peroxide | 0 | — | Colorless |
| CEx. 2 | Hydrogen peroxide | 0 | — | Colorless |

[Notes]
Ex. = Example,
CEx. = Comparative Example,
Examples 1, 2 and 4 and Comparative Examples 1 and 2 used N,N-dimethylallylamine hydrochloride.
Examples 3 and 5 used N,N-diethylallylamine hydrochloride.

In the processes using a radical polymerization initiator having an azo group (Examples 1 to 3), the polymerization rate was high, and the solution after completion of the polymerization was a yellowish and was fine. In contrast, in the processes using tert-butyl hydro peroxide or hydrogen peroxide, no intended polymer was obtained (Comparative Examples 1 and 2). Further, when ammonium persulfate was used as a radical polymerization initiator (Examples 4 and 5), the intended polymer was obtained while the solution after completion of the polymerization were brown.

[Solubility of N,N-dimethylallylamine hydrochloride Polymer in Various Solvents]

The solubility of 0.1 g of the N,N-dimethylallylamine hydrochloride polymer obtained in Example 1 in various solvents (5 ml each) (30° C.) was studied. As a comparative polymer, a monoallylamine hydrochloride polymer (PAA.HCl-3S, molecular weight about 10,000, supplied by Nitto Boseki Co., Ltd.) was used. Table 2 shows the results. The results were that the N,N-dimethylallylamine hydrochloride polymer was more easily dissolved in organic solvents than the monoallylamine hydrochloride polymer.

TABLE 2

|  | Water | Methanol | Diethylene glycol | Ethylene glycol | Acetone |
|---|---|---|---|---|---|
| N,N-dimethyl allylamine hydrochloride polymer | Soluble | Soluble | Soluble | Soluble | Insoluble |
| Mono-allylamine hydrochloride polymer | Soluble | Insoluble | Insoluble | Soluble | Insoluble |

|  | Ethanol | Iso-propanol | Formamide | DMF |
|---|---|---|---|---|
| N,N-dimethyl-allylamine hydrochloride polymer | Soluble | Insoluble | Soluble | Insoluble |
| Mono-allylamine hydrochloride polymer | Insoluble | Insoluble | Soluble | Insoluble |

EXAMPLE 6

Preparation of Purified N,N-dimethylallylamine Polymer

A 2-liter three-necked separable flask having a stirrer, a thermometer and a reflux condenser was charged with 425.75 g (5 mol) of N,N-dimethylallylamine and 66.80 g of water, and these were cooled under stirring. After an internal temperature of 5° C. or lower was reached, 520.89 g (5 mol) of concentrated hydrochloric acid was dropwise added over 5 hours, to prepare an aqueous solution having an N,N-dimethylallylamine hydrochloride concentration of 60 wt %.

Then, the above monomer aqueous solution was heated to 60° C., and after the temperature came to be constant, 86.78 g (6.4 mol % based on the monomer) of 2,2'-azobis(2-amidinopropane) dihydrochloride was added as a radical polymerization initiator, to initiate polymerization. 24 Hours, 48 hours and 72 hours after the initiation of the polymerization, 43.39 g (3.2 mol % based on the monomer) of 2,2'-azobis(2-amidinopropane)dichloride was added each time as well. Thereafter, the polymerization was continued for 24 hours.

After completion of the polymerization, the reaction solution in the separable flask was cooled, and while the temperature was maintained at 5° C., 462.31 g of an aqueous solution having a sodium hydroxide concentration of 49.4 wt % (5.71 mol) was dropwise added for neutralization. After the neutralization, the reaction mixture was diluted with water to be adjusted to have a polymer concentration of 5 wt %, and N,N-dimethylallylamine, a residual monomer, was distilled off at an outer temperature of 60° C. under reduced pressure (80 mmHg) to adjust its content to 250 ppm by weight or less based on the amount of the N,N-dimethylallylamine polymer.

The thus-obtained concentrate was diluted with water to have an N,N-dimethylallylamine polymer concentration of 9 wt %, and 2,680 g thereof (initial conductivity 103,000 $\mu$S/cm) was subjected to ion exchange membrane electrodialysis (using Nippon Rensui K.K. DU-0b model as an ion exchange membrane dialyzer).

Concerning ion exchange membranes, 12 sheets of CMV supplied by Asahi Glass Co., Ltd. were used as cation exchange membranes, and 11 sheets of AMV supplied by Asahi Glass were used as anion exchange membranes. Concerning dialysis conditions, a concentrated liquid vessel was charged with 4 liters of an aqueous solution having a sodium chloride concentration of 1 wt %, each electrode vessel was charged with 4 liters of an aqueous solution having a sodium sulfate concentration of 1 wt %, and a starting liquid vessel was charged with the polymer aqueous solution from which the monomer was removed. While these liquids were circulated at a flow rate of 125 liters/hour, a DC voltage of 13.5 volts was applied between the electrodes. Under the above conditions, the ion exchange membrane electrodialysis was carried out for 8 hours until a conductivity of 7,200 $\mu$S/cm was reached, whereby a purified N,N-dimethylallylamine polymer aqueous solution was obtained. The above ion exchange membrane dialysis showed a polymer recovery ratio, determined by potentiometric titration, of 96%. For determining an ignition residue content, part of the above aqueous solution was combusted in an oven at 650° C. for 2.5 hours, to show an ignition residue content of 0.1% by weight based on the N,N-dimethylallylamine polymer. The polymer had a weight average molecular weight, determined by GPC, of 800.

Figure 3:
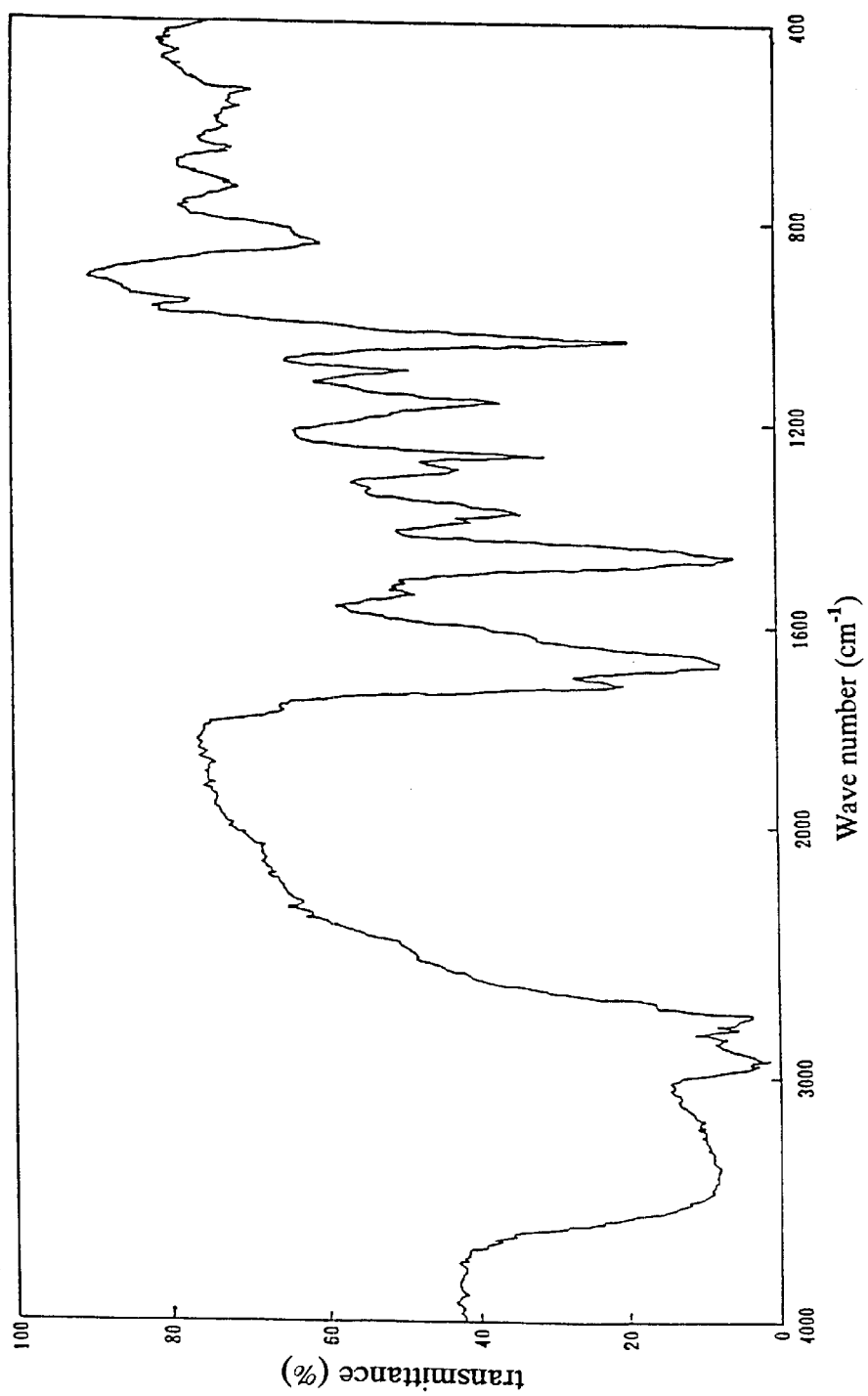
FIG. 3 is an IR spectrum of an N,N-dimethylallylamine polymer obtained in Example 6.

FIG. 3 shows an IR spectrum of a solid N,N-dimethylallylamine polymer prepared by vacuum-drying 0.5 g of the N,N-dimethylallylamine polymer aqueous solution obtained by the above ion exchange membrane electrodialysis, at 60° C. for 24 hours. Absorption at 920 cm$^{-1}$ and 995 cm$^{-1}$, based on out-of-plane deformation vibration derived from hydrogen on C=C double bonds, disappears, which supports that the obtained polymer was an N,N-dimethylallylamine hydrochloride polymer as an end product.

EXAMPLE 7

Preparation of Purified N,N-dimethylallylamine Polymer

A 2-liter separable flask was charged with N,N-dimethylallylamine (5 mol, 425.76 g), and it was cooled with ice under stirring. After an internal temperature of 5° C. or lower was reached, concentrated hydrochloric acid (5 mol, 506.4 g) was dropwise added into the flask over 5 hours. After completion of the addition, the resultant mixture was heated to 60° C., and while the temperature was maintained, a 35 wt % ammonium persulfate (0.8 mol) aqueous solution was dropwise added, and then, polymerization was carried out at 60° C. for 24 hours.

After completion of the polymerization, the separable flask was cooled with ice, and 8.57 mol of sodium hydroxide prepared as a 40 wt % aqueous solution (855.9 g) was dropwise added.

After completion of the neutralization, the reaction mixture was diluted until the mixture had a polymer concentration of 10% by weight, and a monomer was distilled off at 60° C. under reduced pressure (80 mmHg) until the monomer content was reduced to 250 ppm by weight based on the polymer.

The obtained mixture was diluted with water so as to have a polymer concentration of 4% by weight, and 4 liters thereof (initial conductivity 79,000 μS/cm) was subjected to ion exchange membrane electrodialysis (using Nippon Rensui K.K. DU0b model as an ion exchange membrane electric dialyzer). Concerning ion exchange membranes, 12 sheets of CMV supplied by Asahi Glass Co., Ltd. were used as cation exchange membranes, and 11 sheets of AMV supplied by Asahig Glass were used as anion exchange membranes. Electrode vessel were charged with 4 liters of a 1 wt % sodium sulfate aqueous solution.

Concerning dialysis conditions, a concentrated liquid vessel was charged with 4 liters of a 1 wt % sodium chloride aqueous solution, and a starting liquid vessel was charged with the polymer aqueous solution from which the monomer was removed. While these liquids were circulated at a flow rate of 125 liters/hour, a DC voltage of 13.5 volts was applied between the electrodes. Under the above conditions, the ion exchange membrane electrodialysis was carried out until a conductivity of 4,200 μS/cm was reached, whereby a purified N,N-dimethylallylamine polymer aqueous solution was obtained. The yield (potentiometric titration) of the polymer was 80%. For determining an ignition residue content, part of the above aqueous solution was combusted in an oven at 550° C. for 2.5 hours, to show an ignition residue content of 0.12% by weight based on the polymer. The polymer had a weight average molecular weight, determined by GPC, of 600.

Figure 4:
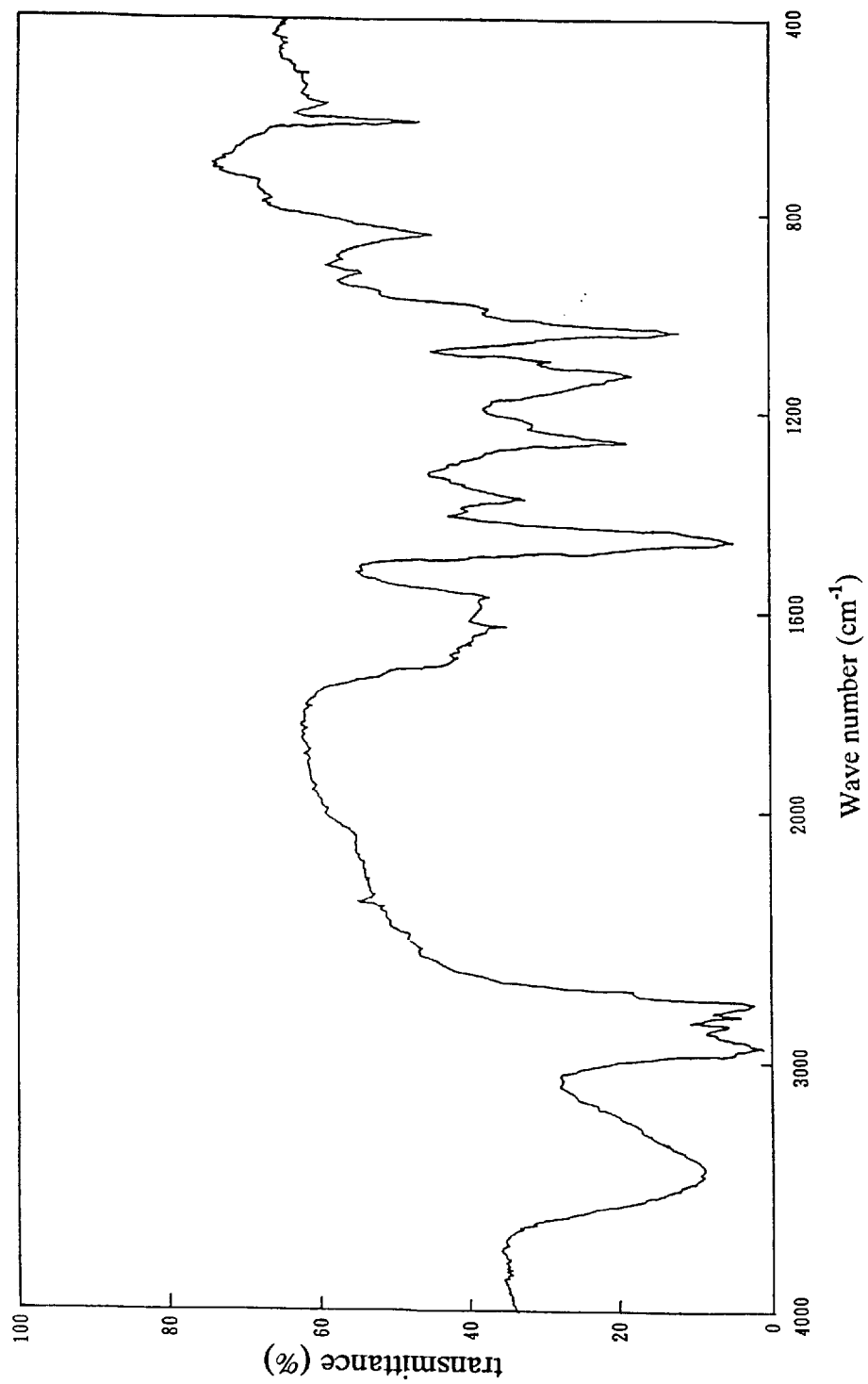
FIG. 4 is an IR spectrum of an N,N-dimethylallylamine polymer obtained in Example 7.

Part of the above purified N,N-dimethylallylamine polymer aqueous solution was taken, water was distilled off under reduced pressure, and a remainder was dried to give the N,N-dimethylallylamine polymer in the form of a solid. FIG. 4 shows an IR spectrum (KBr method) of the obtained N,N-dimethylallylamine polymer. Absorption at 920 cm$^{-1}$ and 995 cm$^{-1}$, based on out-of-plane deformation vibration derived from hydrogen on C=C double bonds, disappears, which supports that the obtained polymer was the polymer as an end product.

EXAMPLE 8

Preparation of Purified N,N-dimethylallylamine hydrochloride Polymer

Figure 5:
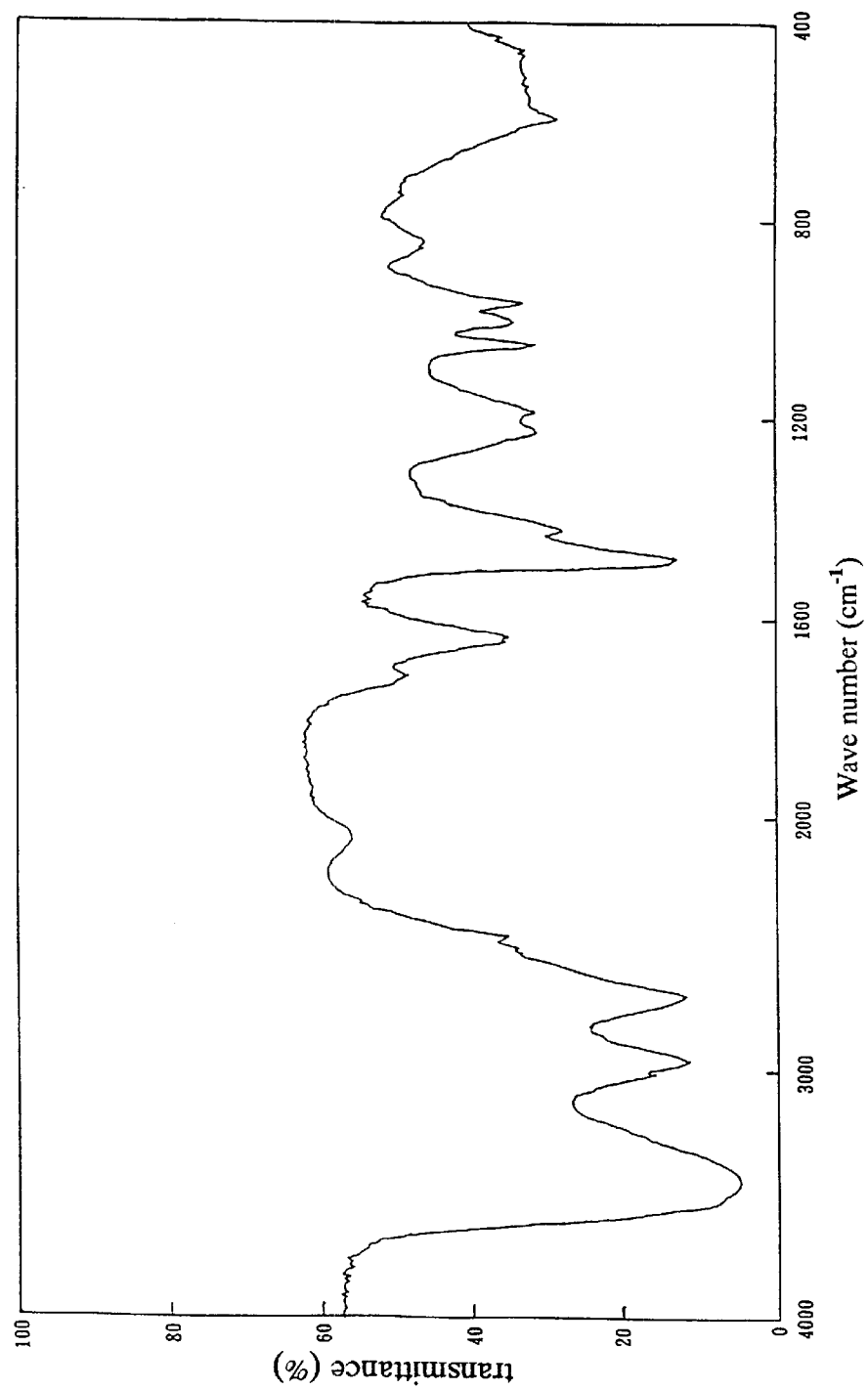
FIG. 5 is an IR spectrum of an N,N-dimethylallylamine hydrochloride polymer obtained in Example 8.

To the purified N,N-dimethylallylamine polymer aqueous solution (7.5 mmol in terms of amine monomer units) obtained in Example 7 was added a 35 wt % hydrochloric acid aqueous solution containing hydrochloric acid in an amount equimolar to the amount of the amine monomer, and then the resultant mixture was concentrated. Then, the concentrate was placed in an acetone-isopropanol 1:1 (weight ratio) mixed solvents, and a formed precipitate was recovered by filtration and dried to give N,N-dimethylallylamine hydrochloride polymer in the form of a solid. FIG. 5 shows an IR spectrum (KBr method) of the obtained N,N-dimethylallylamine hydrochloride polymer. Absorption at 920 cm$^{-1}$ and 995 cm$^{-1}$, based on out-of-plane deformation vibration derived from hydrogen on C=C double bonds, disappears, which supports that the obtained polymer was the polymer as an end product.

[Solubility of N,N-dimethylallylamine hydrochloride Polymer in Various Solvents]

The solubility of 0.1 g of the N,N-dimethylallylamine hydrochloride polymer obtained in Example 8 in various solvents (5 ml each) (30° C.) was studied. As a comparative polymer, a monoallylamine hydrochloride polymer (PAA.HCl-3S, molecular weight about 10,000, supplied by Nitto Boseki Co., Ltd.) was used.

TABLE 3

|  | Water | Methanol | Diethylene glycol | Ethylene glycol | Acetone |
| --- | --- | --- | --- | --- | --- |
| N,N-dimethyl allylamine hydrochloride polymer | Soluble | Soluble | Soluble | Soluble | Insoluble |
| Mono-allylamine hydrochloride polymer | Soluble | Insoluble | Insoluble | Soluble | Insoluble |

|  | Ethanol | Isopropanol | Formamide | DMF |
| --- | --- | --- | --- | --- |
| N,N-dimethyl allylamine hydrochloride polymer | Soluble | Insoluble | Soluble | Insoluble |
| Mono-allylamine hydrochloride polymer | Insoluble | Insoluble | Soluble | Insoluble |

The results were that the N,N-dimethylallylamine hydrochloride polymer was more easily dissolved in organic solvents than the monoallylamine hydrochloride polymer.

29

EXAMPLE 9

Preparation of Copolymer of monoallylamine hydrochloride and N,N-dimethylallylamine hydrochloride (Charged Molar Ratio 0.5:0.5) in the Presence of 2,2'-azobis(2-amidinopropane) dihydrochloride as Radical Polymerization Initiator A 300-ml three-necked flask having a stirrer, a thermometer and a reflux condenser was charged with 64.87 g of an aqueous solution having a monoallylamine hydrochloride concentration of 72.11 wt % (0.50 mol) and 100.99 g of an aqueous solution having an N,N-dimethylallylamine hydrochloride concentration of 60.21 wt % (0.50 mol), and 13.45 g of water was added to adjust a monomer concentration to 60 wt %. The monomer aqueous solution was heated to 60° C., and after the temperature came to be constant, 8.68 g (3.2 mol % based on the monomers) of 2,2'-azobis(2-amidinopropane)dichloride was added as a radical polymerization initiator, to initiate polymerization. 24 Hours, 48 hours and 72 hours after the initiation of the polymerization, 8.68 g of 2,2'-azobis(2-amidinopropane)dihydrochloride was added each time. Thereafter, the polymerization was continued for 24 hours.

Then, the resultant yellowish reaction solution was placed in 3 liters of acetone-isopropanol mixed solvents (weigh ratio 1:1) to re-precipitate a copolymer, and the copolymer was recovered with a glass filter, fully washed and vacuum-dried at 60° C. for 48 hours, to give a copolymer of monoallylamine hydrochloride and N,N-dimethylallylamine hydrochloride (charged molar ratio 0.5:0.5).

Figure 6:
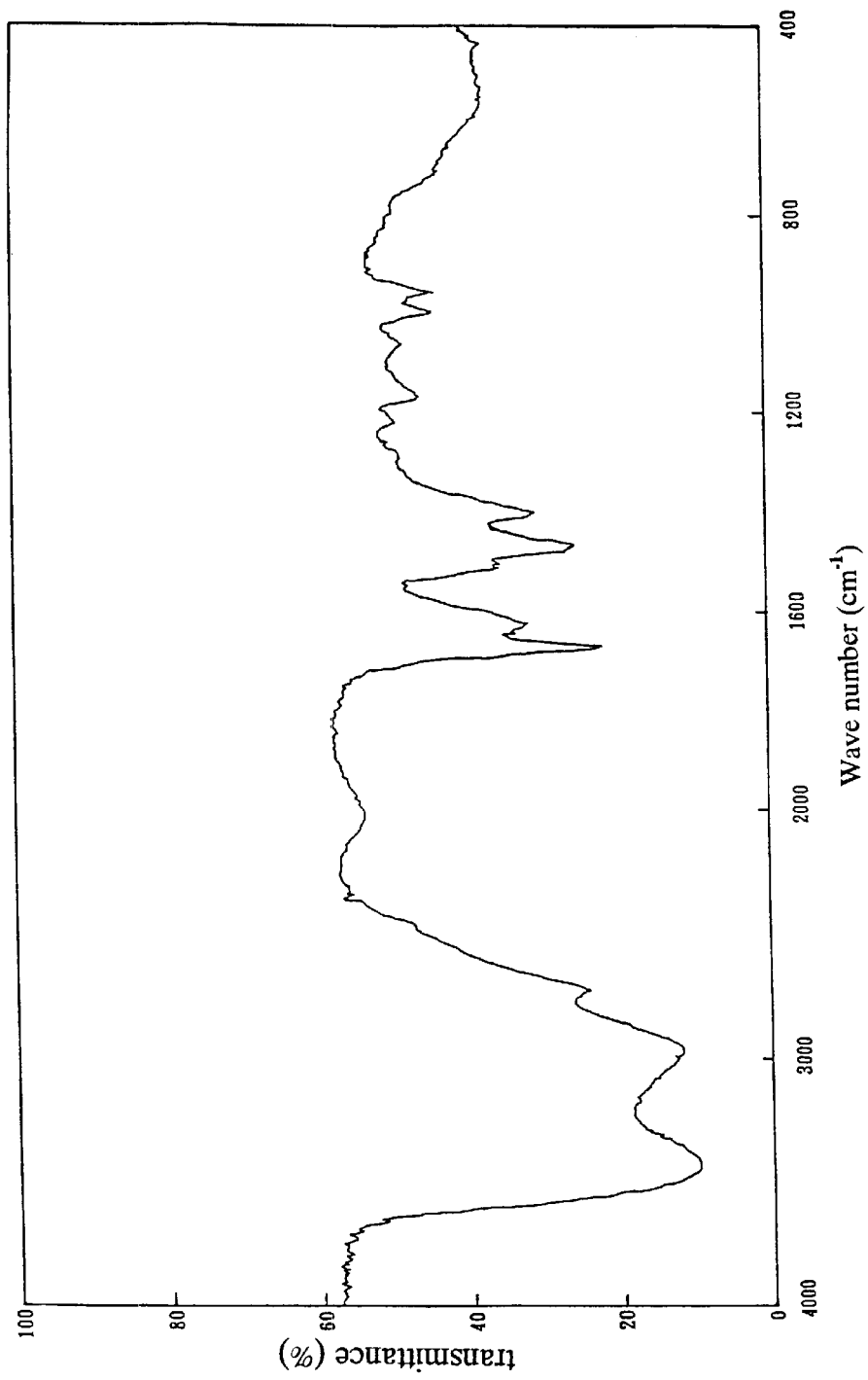
FIG. 6 is an IR spectrum of a copolymer of monoallylamine hydrochloride and N,N-dimethylallylamine hydrochloride, obtained in Example 9.

FIG. 6 shows an IR spectrum (KBr method) of the obtained copolymer. In the absorption spectrum, absorption based on monoallylamine hydrochloride monomer units is observed at 1,510 cm$^{-1}$, and absorptions based on N,N-dimethylallylamine hydrochloride monomer units are observed at 955, 1,400, 1,630, 1,675 and 2,720 cm$^{-1}$. Further, absorption at 920 cm$^{-1}$ and 995 c$^{-1}$, based on out-of-plane deformation vibration derived from hydrogen on allyl type double bonds, disappears.

In GPC chromatogram of the obtained copolymer, 1 peak appeared as a polymer. Further, differing from a monoallylamine hydrochloride homopolymer, the above hydrochloride copolymer was dissolved in methanol, as will be described later.

The above data shows that the obtained polymer is a copolymer of monoallylamine hydrochloride and N,N-dimethylallylamine hydrochloride (charged molar ratio 0.5:0.5).

EXAMPLE 10

Preparation of Copolymer of monoallylamine hydrochloride and N,N-dimethylallylamine hydrochloride (Charged Molar Ratio 0.75:0.25) in the Presence of 2,2'-azobis(2-amidinopropane) dihydrochloride as Radical Polymerization Initiator 97.31 g of an aqueous solution having a monoallylamine hydrochloride concentration of 72.11 wt % (0.75 mol) and 50.50 g of an aqueous solution having an N,N-dimethylallylamine hydrochloride concentration of 60.21 wt % (0.25 mol) were placed in a reactor, and then 19.81 g of water was added to adjust a monomer concentration to 60%. Thereafter, a yellowish reaction solution was obtained, and then, reprecipitation was carried out, in the same manner as in Example 1, to give a copolymer as an end product.

EXAMPLE 11

Preparation of Copolymer of monoallylamine hydrochloride and N,N-dimethylallylamine hydrochloride (Charged Molar Ratio 0.25:0.75) in the Presence of 2,2'-azobis(2-amidinopropane) dihydrochloride as Radical Polymerization Initiator 32.44 g of an aqueous solution having a monoallylamine hydrochloride concentration of 72.11 wt % (0.25 mol) and 151.49 g of an aqueous solution having an N,N-dimethylallylamine hydrochloride concentration of 60.21 wt % (0.75 mol) were placed in a reactor, and then 7.07 g of water was added to adjust a monomer concentration to 60 wt %. Thereafter, a yellowish reaction solution was obtained, and then, reprecipitation was carried out, in the same manner as in Example 1, to give a copolymer as an end product.

EXAMPLE 12

A copolymer of monoallylamine hydrochloride and N,N-dimethylallylamine hydrochloride (charged molar ratio 0.5:0.5) was obtained in the same manner as in Example 9 except that the 2,2'-azobis(2-amidinopropane) dihydrochloride in Example 9 was replaced with 2,2'-azobis[2-(2-imidazoline-2-yl)propane]dihydrochloride.

EXAMPLE 13

A copolymer of monoallylamine hydrochloride and N,N-diethylallylamine hydrochloride (charged molar ratio 0.5:0.5) was obtained in the same manner as in Example 9 except that the N,N-dimethylallylamine hydrochloride in Example 9 was replaced with N,N-diethylallylamine hydrochloride.

EXAMPLE 14

Preparation of Copolymer of monoallylamine hydrochloride and N,N-dimethylallylamine hydrochloride (Charged Molar Ratio 0.5:0.5) in the Presence of ammonium persulfate as Radical Polymerization Initiator A one-liter three-necked separable flask having a stirrer, a thermometer and a reflux condenser was charged with 158.10 g of an aqueous solution having a monoallylamine hydrochloride concentration of 88.76 wt % (1.50 mol) and 244.17 g of an aqueous solution having an N,N-dimethylallylamine hydrochloride concentration of 74.71 wt % (1.50 mol), and 94.27 g of water was added to adjust a monomer concentration to 65 wt %. The monomer aqueous solution was heated to 60° C., and after the temperature came to be constant, 6.85 g (1 mol % based on the monomers) of ammonium persulfate was added as a radical polymerization initiator, to initiate polymerization. 4 Hours, 5 hours, 6 hours, 24 hours and 26 hours after the initiation of the polymerization, 13.69 g (2 mol % based on the monomers) of ammonium persulfate was added each time. Thereafter, the polymerization was continued for 24 hours, to give an aqueous solution of a copolymer of monoallylamine hydrochloride and N,N-dimethylallylamine hydrochloride (charged molar ratio 0.5:0.5).

Part of the above aqueous solution was taken out, a sodium hydroxide aqueous solution was added thereto to completely neutralize the above aqueous solution, and unreacted monoallylamine and N,N-dimethylallylamine were distilled off at 60° C. under reduced pressure (80 mmHg). The resultant solution was measured for a concentration of monoallylamine and N,N-dimethylallylamine by potentiometric titration using 1N hydrochloric acid, to determine a polymerization rate.

EXAMPLE 15

Preparation of Copolymer of monoallylamine hydrochloride and N,N-dimethylallylamine hydrochloride (Charged Molar Ratio 0.75:0.25) in the Presence of ammonium persulfate as Radical Polymerization Initiator The same reactor as that used in Example 14 was charged with 237.16 g of an aqueous solution having a monoallylamine hydrochloride concentration of 88.76 wt % (2.25 mol) and 122.09 g of an aqueous solution having an N,N-dimethylallylamine hydrochloride concentration of 74.71 wt % (0.75 mol), and then 104.92 g of water was added to adjust a monomer concentration to 65%. Thereafter, an aqueous solution of a copolymer of monoallylamine hydrochloride and N,N-dimethylallylamine hydrochloride (charged molar ratio 0.75:0.25) was obtained in the same manner as in Example 4.

EXAMPLE 16

Preparation of Copolymer of monoallylamine hydrochloride and N,N-dimethylallylamine hydrochloride (Charged Molar Ratio 0.25:0.75) in the Presence of ammonium persulfate as Radical Polymerization Initiator The same reactor as that used in Example 14 was charged with 79.06 g of an aqueous solution having a monoallylamine hydrochloride concentration of 88.76 wt % (0.75 mol) and 366.24 g of an aqueous solution having an N,N-dimethylallylamine hydrochloride concentration of 74.71 wt % (2.25 mol), and then 83.61 g of water was added to adjust a monomer concentration to 65 wt %. Thereafter, an aqueous solution of a copolymer of monoallylamine hydrochloride and N,N-dimethylallylamine hydrochloride (charged molar ratio 0.25:0.75) was obtained in the same manner as in Example 14.

Comparative Example 3

Preparation of Copolymer of monoallylamine hydrochloride and N,N-dimethylallylamine hydrochloride (Charged Molar Ratio 1:1) in the Presence of tert-butylhydroperoxide as Radical Polymerization Initiator An attempt was made to repeat Example 9 except that the 2,2'-azobis(2-amidinopropane)dihydrochloride was replaced with an equimolar amount of tert-butylhydroperoxide (t-BuOOH) as a radical polymerization initiator. However, almost no intended copolymer was obtained.

Comparative Example 4

Preparation of Copolymer of monoallylamine hydrochloride and N,N-dimethylallylamine hydrochloride (Charged Molar Ratio 1:1) in the Presence of hydrogen peroxide as Radical Polymerization Initiator An attempt was made to repeat Example 9 except that the 2,2'-azobis(2-amidinopropane)dihydrochloride was replaced with 50 wt % hydrogen peroxide aqueous solution containing an equmolar amount of hydrogen peroxide as a radical polymerization initiator. However, almost no intended copolymer was obtained.

[Polymerization Rate and Weight Average Molecular Weight of Copolynomers and Coloring Degree of Polymerization Solutions, Obtained in Examples 9 to 16 and Comparative Examples 3and 4]

Table 4 shows polymerization rates (%) and weight average molecular weights of the copolymers and coloring degrees of the polymerization solutions obtained in Examples 9 to 16 and Comparative Examples 3 and 4.

TABLE 4

| | Initiator (mol % based on monomer) | Charged molar ratio (MAA.HCl/ DMAA.HCl) | Monomer concentration (%) |
|---|---|---|---|
| Example | | | |
| 9 | 2,2'-azobis(2-amidinopropane)dihydrochloride (12.8) | 0.50/0.50 | 60 |
| 10 | 2,2'-azobis(2-amidinopropane)dihydrochloride (12.8) | 0.75/0.25 | 60 |
| 11 | 2,2'-azobis(2-amidinopropane)dihydrochloride (12.8) | 0.25/0.75 | 60 |
| 12 | 2,2'-azobis[(2-(2-imidazoline-2-yl)propane)dihydrochloride (12.6) | 0.50/0.50 | 60 |
| 13 | 2,2'-azobis(2-amidinopropane)dihydrochloride (12.8) | 0.50/0.50 | 60 |
| 14 | Ammonium persulfate (14.0) | 0.50/0.50 | 65 |
| 15 | Ammonium persulfate (14.0) | 0.75/0.25 | 65 |
| 16 | Ammonium persulfate (14.0) | 0.25/0.75 | 65 |
| Comparative Example | | | |
| 3 | t-BuOOH (12.8) | 0.50/0.50 | 65 |
| 4 | $H_2O_2$ (12.8) | 0.50/0.50 | 65 |

| | Time period of Polymerization (hour) | Weight average molecular weight | Polymerization ratio | Coloring degree |
|---|---|---|---|---|
| Example | | | | |
| 9 | 96 | 800 | 86 | Yellowish |
| 10 | 96 | 700 | 97 | Yellowish |
| 11 | 96 | 800 | 83 | Yellowish |
| 12 | 96 | 3700 | 82 | Reddish |
| 13 | 96 | 500 | 83 | Yellowish |
| 14 | 29 | 800 | 82 | Brown |
| 15 | 29 | BOO | 85 | Brown |
| 16 | 29 | 900 | 80 | Brown |
| Comparative Example | | | | |
| 3 | 29 | — | trade amount | Yellowish |
| 4 | 29 | — | trace amount | Yellowish |

[Notes]
Example 13 used N,N-diethylallylamine hydrochloride, and the others used N,N-dimethylallylamine hydrochloride.

Polymerization rate data of Examples 9 to 13 and Comparative Examples 3 and 4 in Table 4 were determined on the basis of weights obtained by a re-precipitation method. Polymerization rate data of Examples 14 to 16 were determined by the potentiometric titration method described in Example 14.

[Solubility of Copolymer of monoallylamine hydrochloride and N,N-dimethyallylamine hydrochloride in Various Solvents]

The solubility of 0.1 g of copolymer of monoallylamine hydrochloride and N,N-dimethylallylamine hydrachloride in various solvents (5 ml each) was studied. As a copolymer of monoallylamine hydrochloride and N,N-dimethyallylamine hydrochloride, the copolymer for which the charged molar ratio was 0.5:0.5 (the copolymer obtained in Example 9), the copolymer for which the charged molar ratio was 0.75:0.25 (the copolymer obtained in Example 10) and the copolymer for which the charged molar ratio was 0.25:0.75 (the copolymer obtained in Example 11) were used. Further, as a comparative polymer, a monoallylamine hydrochloride homopolymer (PAA.HCl-3S, molecular weight about 10,000, supplied by Nitto Boseki Co., Ltd.) was used. Table 5 shows the results.

TABLE 5

| | Charged molar ratio (MAA.HCl/ DMAA.HCl) | Water | Methanol | Diethylene glycol | Ethylene glycol |
|---|---|---|---|---|---|
| Copolymer of Example 9 | 0.50/0.50 | Soluble | Soluble | Soluble | Soluble |
| Copolymer of Example 10 | 0.75/0.25 | Soluble | Soluble | Soluble | Soluble |
| Copolymer of Example 11 | 0.25/0.75 | Soluble | Soluble | Soluble | Soluble |
| Comparative Polymer | 1.00/0.00 | Soluble | Insoluble | insoluble | Soluble |

| | Acetone | Ethanol | Iso-propanol | Formamide | DMF |
|---|---|---|---|---|---|
| Copolymer of Example 9 | Insoluble | Insoluble | Insoluble | Soluble | Insoluble |
| Copolymer of Example 10 | Insoluble | Insoluble | Insoluble | Soluble | Insoluble |
| Copolymer of Example 11 | Insoluble | Soluble | Insoluble | Soluble | Insoluble |
| Comparative Polymer | Insoluble | Insoluble | Insoluble | Soluble | Insoluble |

As is shown in Table 5, the hydrochloride copolymers from the monomers in various charged molar ratios, produced according to the present invention, were dissolved in organic solvents such as methanol, diethylene glycol, and the like, which shows that the hydrochloride copolymer of the present invention can be suitably applied to fields, e.g., of an anchor coat, where the use of the monoallylamine hydrochloride homopolymer is limited due to its non-solubility in organic solvents such as methanol.

EXAMPLE 17

Preparation of Purified Copolymer of monoallylamine and N,N-dimethylallylamine (Charged Molar Ratio 0.5:0.5)

A 5-liter three-necked separable flask having a stirrer, a thermometer and a reflux condenser was charged with 1,066 g of an aqueous solution having a monoallylamine hydrochloride concentration of 70.22 wt % (8.0 mol) and 1,340 g of an aqueous solution having an N,N-dimethylallylamine hydrochloride concentration of 72.61 wt % (8.0 mol), then, 242 g of water was added to adjust a monomer concentration to 65 wt %. The monomer aqueous solution was heated to 60° C., and after the temperature came to be constant, 86.78 g (2.0 mol % based on the monomers) of 2,2'-azobis(2-amidinopropane)dihydrochloride as a radical polymerization initiator was added seven times (14.0 mol % in total based on the monomers) every 24 hours, to carry out polymerization. The total period of time for the polymerization was 168 hours.

After completion of the polymerization, 813.9 g of a yellowish reaction solution in the separable flask was cooled, and while the temperature was maintained at 5° C., 441.6 g (5.20 mol) of an aqueous solution having a sodium hydroxide concentration of 47.1 wt % was dropwise added for neutralization. After the neutralization, the reaction mixture was diluted with water to be adjusted to have a polymer concentration of 15 wt %, and unreacted monoallylamine and N,N-dimethylallylamine were distilled off at 60° C. under reduced pressure (80 mmHg) to adjust a monomer content to 250 ppm by weight or less based on the amount of the copolymer as an end product.

The thus-obtained concentrate was diluted with water to adjust a concentration of the copolymer of monoallylamine and N,N-dimethylallylamine polymer to 5 wt %, and 3,060 g thereof (initial conductivity 127,000 $\mu$S/cm) was subjected to ion exchange membrane electrodialysis (using Nippon Rensui K.K. DU-0b model as an ion exchange membrane dialyzer).

Concerning ion exchange membranes, 12 sheets of CMV supplied by Asahi Glass Co., Ltd. were used as cation exchange membranes, and 11 sheets of AMV supplied by Asahi Glass were used as anion exchange membranes. Concerning dialysis conditions, a concentrated liquid vessel was charged with 4 liters of an aqueous solution having a sodium chloride concentration of 1 wt %, each electrode vessel was charged with 4 liters of an aqueous solution having a sodium sulfate concentration of 1 wt %, and a starting liquid vessel was charged with the copolymer aqueous solution from which the monomer was removed. While these liquids were circulated at a flow rate of 125 liters/hour, a DC voltage of 13.5 volts was applied between the electrodes. Under the above conditions, the ion exchange membrane electrodialysis was carried out for 7.5 hours until a conductivity of 7,100 $\mu$S/cm was reached, whereby a purified aqueous solution of the copolymer of monoallylamine and N,N-dimethylallylamine was obtained.

The above ion exchange membrane dialysis showed a polymer recovery ratio, determined by potentiometric titration, of 96%. For determining an ignition residue content, part of the above aqueous solution was combusted in an oven at 650° C. for 2.5 hours, to show an ignition residue content of 0.1% by weight based on the copolymer of monoallylamine and N,N-dimethylallylamine. The polymer had a weight average molecular weight, determined by GPC, of 900.

EXAMPLE 18

Preparation of Copolymer of N,N-dimethylallylamine hydrochloride and diallylamine hydrochloride (Charged Molar Ratio 0.7:0.3) in the Presence of 2,2'-azobis(2-amidinopropane) dihydrochloride as Radical Polymerization Initiator A one-liter separable flask having a stirrer, a thermometer and a reflux condenser was charged with 237.6 g of an aqueous solution having an N,N-dimethylallylamine hydrochloride concentration of 71.66 wt % (1.4 mol) and 122.1 g of an aqueous solution having a diallylamine hydrochloride concentration of 65.69 wt % (0.6 mol), then, the resultant aqueous solution having a monomer concentration of 69.64 wt % was heated to 60° C., and after the temperature came to be constant, 13.6 g (2.5 mol % based on the monomers) of 2,2'-azobis(2-amidinopropane) dihydrochloride was added as a radical polymerization initiator to initiate polymerization. 8 Hours, 24 hours, 32 hours and 48 hours after the initiation of the polymerization, 13.6 g (2.5 mol % based on the monomers) of 2,2'-azobis(2-amidinopropane) dihydrochloride was also added each time.

Thereafter, the polymerization was further continued for 24 hours, to give a copolymer of N,N-dimethylallylamine hydrochloride and diallylamine hydrochloride (charged molar ratio 0.7:0.3) in the form of a yellowish solution.

EXAMPLE 19

Preparation of Copolymer of N,N-dimethylallylamine hydrochloride and diallylamine hydrochloride (Charged Molar Ratio 0.8:0.2) in the Presence of 2,2'-azobis(2-amidinopropane) dihydrochloride as Radical Polymerization Initiator The reactor as that used in Example 18 was charged with 271.5 g of an aqueous solution having an N,N-dimethylallylamine hydrochloride concentration of 71.66 wt % (1.6 mol) and 81.4 g of an aqueous solution having a diallylamine hydrochloride concentration of 65.69 wt % (0.4. mol), and then, the resultant aqueous solution having a monomer concentration of 70.30 wt % was treated in the same manner as in Example 18, to give a copolymer of N,N-dimethylallylamine hydrochloride and diallylamine hydrochloride (charged molar ratio 0.8:0.2) in the form of a yellowish solution.

EXAMPLE 20

Preparation of Copolymer of N,N-dimethylallylamine hydrochloride and diallylamine hydrochloride (Charged Molar Ratio 0.9:0.1) in the Presence of 2,2'-azobis(2-amidinopropane) dihydrochloride as Radical Polymerization Initiator The reactor as that used in Example 18 was charged with 305.5 g of an aqueous solution having an N,N-dimethylallylamine hydrochloride concentration of 71.66 wt % (1.8 mol) and 40.7 g of an aqueous solution having a diallylamine hydrochloride concentration of 65.69 wt % (0.2 mol), and then, the resultant aqueous solution having a monomer concentration of 70.94 wt % was treated in the same manner as in Example 18, to give a copolymer of N,N-dimethylallylamine hydrochloride and diallylamine hydrochloride (charged molar ratio 0.9:0.1) in the form of a yellowish solution.

EXAMPLE 21

Preparation of Copolymer of N,N-dimethylallylamine hydrochloride and N-methyldiallylamine hydrochloride (Charged Molar Ratio 0.7:0.3) in the Presence of 2,2'-azobis(2-amidinopropane)dihydrochloride as Radical Polymerization Initiator The same reactor as that used in Example 18 was charged with 284.87 g of an aqueous solution having an N,N-dimethylallylamine hydrochloride concentration of 74.71 wt % (1.75 mol) and 184.14 g of an aqueous solution having an N-methyldiallylamine hydrochloride concentration of 60.17 wt % (0.75 mol), then, the resultant aqueous solution having a monomer concentration of 68.99 wt % was heated to 60° C., and after the temperature came to be constant, 16.95 g (2.5 mol % based on the monomers) of 2,2'-azobis(2-amidinopropane)dihydrochloride was added as a radical polymerization initiator to initiate polymerization. 24 Hours, 48 hours and 96 hours after the initiation of the polymerization, 16.95 g (2.5 mol % based on the monomers) of 2,2'-azobis(2-amidinopropane)dihydrochloride was also added each time. Thereafter, the polymerization was further continued for 72 hours, to give a copolymer of N,N-dimethylallylamine hydrochloride and N-methyldiallylamine hydrochloride (charged molar ratio 0.7:0.3) in the form of a yellowish solution.

EXAMPLE 22

Preparation of Copolymer of N,N-dimethylallylamine hydrochloride and N-methyldiallylamine hydrochloride (Charged Molar Ratio 0.8:0.2) in the Presence of 2,2'-azobis(2-amidinopropane)dihydrochloride as Radical Polymerization Initiator The same reactor as that used in Example 18 was charged with 474.24 g of an aqueous solution having an N,N-dimethylallylamine hydrochloride concentration of 61.54 wt % (2.4 mol) and 147.23 g of an aqueous solution having an N-methyldiallylamine hydrochloride concentration of 60.17 wt % (0.6 mol), and 12.62 g of water was added to adjust a monomer concentration to 60.00 wt %. The resultant monomer solution was heated to 60° C., and after the temperature came to be constant, 20.34 g (2.5 mol % based on the monomers) of 2,2'-azobis(2-amidinopropane) dihydrochloride was added as a radical polymerization initiator to initiate polymerization. 24 Hours, 48 hours and 72 hours after the initiation of the polymerization, 20.34 g (2.5 mol % based on the monomers) of 2,2'-azobis(2-amidinopropane) dihydrochloride was also added each time. Thereafter, the polymerization was further continued for 96 hours, to give a copolymer of N,N-dimethylallylamine hydrochloride and N-methyldiallylamine hydrochloride (charged molar ratio 0.8:0.2) in the form of a yellowish solution.

EXAMPLE 23

Preparation of Copolymer of N,N-dimethylallylamine hydrochloride and N-methyldiallylamine hydrochloride (Charged Molar Ratio 0.9:0.1) in the Presence of 2,2'-azobis(2-amidinopropane)dihydrochloride as Radical Polymerization Initiator The same reactor as that used in Example 18 was charged with 533.55 g of an aqueous solution having an N,N-dimethylallylamine hydrochloride concentration of 61.54 wt % (2.7 mol) and 73.61 g of an aqueous solution having an N-methyldiallylamine hydrochloride concentration of 60.17 wt % (0.3 mol), and 13.93 g of water was added to adjust a monomer concentration to 60.00 wt %. The resultant monomer solution was heated to 60° C., and after the temperature came to be constant, 20.34 g (2.5 mol % based on the monomers) of 2,2'-azobis(2-amidinopropane) dihydrochloride was added as a radical polymerization initiator to initiate polymerization. 24 Hours, 48 hours, 72 hours and 105 hours after the initiation of the polymerization, 20.34 g (2.5 mol % based on the monomers) of 2,2'-azobis(2-amidinopropane)dihydrochloride was also added each time. Thereafter, the polymerization was further continued for 63 hours, to give a copolymer of N,N-dimethylallylamine hydrochloride and N-methyldiallylamine hydrochloride (charged molar ratio 0.9:0.1) in the form of a yellowish solution.

EXAMPLE 24

Preparation of Copolymer of N,N-dimethylallylamine hydrochloride and N-methyldiallylamine hydrochloride (Charged Molar Ratio 0.7:0.3) in the Presence of ammonium persulfate as Radical Polymerization Initiator The same reactor as that used in Example 18 was charged with 237.58 g of an aqueous solution having an N,N- dimethylallylamine hydrochloride concentration of 71.66 wt % (1.4 mol) and 147.23 g of an aqueous solution having an N-methyldiallylamine hydrochloride concentration of 60.17 wt % (0.6 mol), then, the resultant aqueous solution having a monomer concentration of 67.27 wt % was heated to 60° C., and after the temperature came to be constant, 4.56 g (1 mol % based on the monomers) of ammonium persulfate was added as a radical polymerization initiator to initiate polymerization. 2 Hours and 4 hours after the initiation of the polymerization, 4.56 g (1 mol % based on the monomers) of ammonium persulfate was also added each time. Further, 23 hours, 24 hours, 25 hours, 26 hours, 27 hours and 28 hours thereafter, 9.13 g (2 mol % based on the monomers) of ammonium persulfate was also added each time. The polymerization was further continued for 3 hours, to give a copolymer of N,N-dimethylallylamine hydrochloride and N-methyldiallylamine hydrochloride (charged molar ratio 0.7:0.3) in the form of a brown solution.

EXAMPLE 25

Preparation of Copolymer of N,N-dimethylallylamine hydrochloride and N-methyldiallylamine hydrochloride (Charged Molar Ratio 0.8:0.2) in the Presence of ammonium persulfate as Radical Polymerization Initiator The same reactor as that used in Example 18 was charged with 271.53 g of an aqueous solution having an N,N-dimethylallylamine hydrochloride concentration of 71.66 wt % (1.6 mol) and 98.16 g of an aqueous solution having an N-methyldiallylamine hydrochloride concentration of 60.17 wt % (0.4 mol), then, the resultant aqueous solution having a monomer concentration of 68.61 wt % was treated in the same manner as in Example 24, to give a copolymer of N,N-dimethylallylamine hydrochloride and N-methyldiallylamine hydrochloride (charged molar ratio 0.8:0.2) in the form of a brown solution.

EXAMPLE 26

Preparation of Copolymer of N,N-dimethylallylamine hydrochloride and N-methyldiallylamine hydrochloride (Charged Molar Ratio 0.9:0.1) in the Presence of ammonium persulfate as Radical Polymerization Initiator The same reactor as that used in Example 18 was charged with 533.56 g of an aqueous solution having an N,N-dimethylallylamine hydrochloride concentration of 61.54 wt % (2.7 mol) and 73.62 g of an aqueous solution having an N-methyldiallylamine hydrochloride concentration of 60.17 wt % (0.3 mol), then, the resultant aqueous solution having a monomer concentration of 61.37 wt % was heated to 60° C., and after the temperature came to be constant, 6.85 g (1.0 mol % based on the monomers) of ammonium persulfate was added as a radical polymerization initiator to initiate polymerization.

2 Hours and 4 hours after the initiation of the polymerization, 6.85 g (1 mol % based on the monomers) of ammonium persulfate was also added each time. Further, 23 hours, 24 hours, 25 hours, 26 hours, 27 hours, 47 hours and 48 hours thereafter, 13.69 g (2.0 mol % based on the monomers) of ammonium persulfate was also added each time. The polymerization was further continued for 2 hours, to give a copolymer of N,N-dimethylallylamine hydrochloride and N-methyldiallylamine hydrochloride (charged molar ratio 0.9:0.1) in the form of a brown solution.

EXAMPLE 27

Preparation of Copolymer of N,N-dimethylallylamine hydrochloride and N-(2-hydroxyethyl)diallylamine hydrochloride (Charged Molar Ratio 0.7:0.3) in the Presence of 2,2'-azobis(2-amidinopropane)dihydrochloride as Radical Polymerization Initiator The same reactor as that used in Example 18 was charged with 175.86 g of an aqueous solution having an N,N-dimethylallylamine hydrochloride concentration of 72.61 wt % (1.05 mol) and 111.93 g of an aqueous solution having an N-(2-hydroxyethyl)diallylamine hydrochloride concentration of 71.44 wt % (0.45 mol), then, 8.85 g of water was added to adjust a monomer concentration to 70.00 wt %. The resultant monomer aqueous solution was heated to 60° C., and after the temperature came to be constant, 8.14 g (2 mol % based on the monomers) of 2,2'-azobis(2-amidinopropane) dihydrochloride was added as a radical polymerization initiator to initiate polymerization. 24 Hours, 48 hours, 72 hours and 120 hours after the initiation of the polymerization, 8.14 g (2 mol % based on the monomers) of 2,2'-azobis(2-amidinopropane)dihydrochloride was also added each time. Thereafter, the polymerization was further continued for 48 hours, to give a copolymer of N,N-dimethylallylamine hydrochloride and N-(2-hydroxyethyl) diallylamine hydrochloride (charged molar ratio 0.7:0.3) in the form of a yellowish solution.

EXAMPLE 28

Preparation of Copolymer of N,N-dimethylallylamine hydrochloride and N-(2-hydroxyethyl)diallylamine hydrochloride (Charged Molar Ratio 0.8:0.2) in the Presence of 2,2'-azobis (2-amidinopropane)dihydrochloride as Radical Polymerization Initiator The same reactor as that used in Example 18 was charged with 200.98 g of an aqueous solution having an N,N-dimethylallylamine hydrochloride concentration of 72.61 wt % (1.2 mol) and 74.61 g of an aqueous solution having an N-(2-hydroxyethyl)diallylamine hydrochloride concentration of 71.44 wt % (0.3 mol), then, 9.02 g of water was added to adjust a monomer concentration to 70.00 wt %. The resultant monomer aqueous solution was treated in the same manner as in Example 27, to give a copolymer of N,N-dimethylallylamine hydrochloride and N-(2-hydroxyethyl) diallylamine hydrochloride (charged molar ratio 0.8:0.2) in the form of a yellowish solution.

EXAMPLE 29

Preparation of Copolymer of N,N-dimethylallylamine hydrochloride and diallylamine hydrochloride (Charged Molar Ratio 0.7:0.3) in the Presence of 2,2'-azobis[2-(2-imidazoline-2-yl) propane]dihydrochloride as Radical Polymerization Initiator A copolymer of N,N-dimethylallylamine hydrochloride and diallylamine hydrochloride (charged molar ratio 0.7:0.3) was obtained in the same manner as in Example 18 except that the 2,2'-azobis(2-amidinopropane) dihydrochloride in Example 18 was replaced with an equimolar amount of 2,2'-azobis[2-(2-imidazolin-2-yl) propane]dihydrochloride.

EXAMPLE 30

A copolymer of N,N-diethylallylamine hydrochloride and diallylamine hydrochloride (charged molar ratio 0.7:0.3)

was obtained in the same manner as in Example 18 except that the N,N-dimethylallylamine hydrochloride was replaced with N,N-diethylallylamine hydrochloride.

Comparative Example 5

Preparation of Copolymer of N,N-dimethylallylamine hydrochloride and diallylamine hydrochloride (Charged Molar Ratio 0.8:0.2) in the Presence of tert-butyl hydroperoxide as Radical Polymerization Initiator An attempt was made to prepare a copolymer in the same manner as in Example 19 except that the 2,2'-azobis(2-amidinopropane)dihydrochloride was replaced with an equimolar amount of tert-butyl hydroperoxide (t-BuOOH). However, almost no copolymer as an end product was obtained.

Comparative Example 6

Preparation of Copolymer of N,N-dimethylallylamine hydrochloride and diallylamine hydrochloride (Charged Molar Ratio 0.8:0.2) in the Presence of hydrogen peroxide as Radical Polymerization Initiator An attempt was made to prepare a copolymer in the same manner as in Example 19 except that the 2,2'-azobis(2-amidinopropane)dihydrochloride was replaced with an equimolar amount of a 50 wt % hydrogen peroxide aqueous solution. However, almost no copolymer as an end product was obtained.

[Weight Average Molecular Weight, Polymerization Rate and Coloring Degree of Copolymers Obtained in Examples 18 to 30 and Comparative Examples 5 and 6]

Table 6 shows weight average molecular weight, polymerization ratio and coloring degree data of the copolymers obtained in Examples 18 to 30 and Comparative Examples 5 and 6.

TABLE 6

|  | Initiator (mol % based on momomer) | Monomer ratio (molar ratio of DAAA/ diallylamine derivative in copolymerization) | Monomer concentration (%) |
|---|---|---|---|
| Example |  |  |  |
| 18 | Azo A | DMAA/DAA (0.7/0.3) | 69.6 |
| 19 | Azo A | DMAA/DAA (0.8/0.2) | 70.3 |
| 20 | Azo A | DMAA/DAA (0.9/0.1) | 70.9 |
| 21 | Azo A | DMAA/MDAA (0.7/0.3) | 69.0 |
| 22 | Azo A | DMAA/MDAA (0.8/0.2) | 60.0 |
| 23 | Azo A | DMAA/MDAA (0.9/0.1) | 60.0 |
| 24 | APS | DMAA.MDAA (0.7/0.3) | 62.3 |
| 25 | APS | DMAA.MDAA (0.8/0.2) | 68.6 |
| 26 | APS | DMAA/MDAA (0.9/0.1) | 61.4 |
| 27 | Azo A | DMAA/HEDAA (0.7/0.3) | 70.0 |
| 28 | Azo A | DMAA/HEDAA (0.8/0.2) | 70.0 |
| 29 | Azo B | DMAA/DAA (0.7/0.3) | 69.6 |
| 30 | Azo A | DEAA/DAA (0.7/0.3) | 69.6 |
| Comparative Example |  |  |  |
| 5 | t-BUOOH | DMAA/DAA (0.8/0.2) | 70.3 |
| 6 | $H_2O_2$ | DMAA/DAA (0.8/0.2) | 70.3 |

TABLE 6-continued

|  | Time period of Polymerization (hour) | Weight average molecular weight | Polymerization ratio (%) | Coloring degree |
|---|---|---|---|---|
| Example |  |  |  |  |
| 18 | 72 | 2,200 | 67 | Yellowish |
| 19 | 72 | 1,700 | 70 | Yellowish |
| 20 | 72 | 1,400 | 61 | Yellowish |
| 21 | 168 | 2,400 | 84 | Yellowish |
| 22 | 168 | 1,400 | 84 | Yellowish |
| 23 | 168 | 1,000 | 83 | Yellowish |
| 24 | 31 | 1,800 | 95 | Brown |
| 25 | 31 | 1,200 | 92 | Brown |
| 26 | 50 | 700 | 87 | Brown |
| 27 | 168 | 2,400 | 93 | Yellowish |
| 28 | 168 | 1,700 | 87 | Yellowish |
| 29 | 72 | 2,600 | 61 | Reddish |
| 30 | 72 | 1,300 | 65 | Yellowish |
| Comparative Example |  |  |  |  |
| 5 | 72 | — | — | Yellowish |
| 6 | 72 | — | — | Yellowish |

In Table, as abbreviations,
Azo A; 2,2'-azobis(2-amidinopropane)dihydrochloride,
Azo B; 2,2'-azobis[2-(2-imidazoline-2-yl)propane] dihydrochloride,
APS; ammonium persulfate
DAAA; N,N-dialkylallylamine hydrochloride,
DMAA; N,N-dimethylallylamine hydrochloride,
DEAA; N,N-diethylallylamine hydrochloride,
DAA; diallylamine hydrochloride,
MDAA; N-methyldiallylamine hydrochloride, and
HEDAA; N-(2-hydroxyethyl)diallylamine hydrochloride are used.

Data of the polymerization rate in Table 6 were determined by a GPC method. Measurements of weight average molecular weights and coloring degrees were as described before.

As shown in Table 6, in the process using a radical polymerization initiator having an azo group (Examples 18 to 23 and 27 to 30) and the process using persulfate (Examples 24 to 26), the copolymers as end products were obtained at a high polymerization rate. Of these, the process using a radical polymerization initiator having an azo group gives a yellowish and good solution after completion of the copolymerization, and is therefore particularly preferred as a production process.

EXAMPLE 31

Preparation of Purified Copolymer of N,N-dimethylallylamine and diallylamine (Charged Molar Ratio 0.8:0.2)

An aqueous solution of a copolymer of N,N-dimethylallylamine hydrochloride and diallylamine hydrochloride (charged molar ratio 0.8:0.2), obtained in the same manner as in Example 19, was cooled with ice, and 191.9 g of an aqueous solution containing 48.6% by weight of sodium hydroxide (2.33 mol) was dropwise added thereto.

After completion of the neutralization, the reaction mixture was diluted with water until it had a polymer concentration of 10 wt %, and a monomer was distilled off at 60° C. under reduced pressure (80 mmHg) until the monomer content was reduced to 250 ppm by weight based on the polymer.

The obtained mixture was diluted with water so as to have a polymer concentration of 3.4 at % and 2,500 g thereof (initial conductivity 7,000 µS/cm) was subjected to ion exchange membrane electrodialysis (Nippon Rensui K.K. DU0b model was used as an ion exchange membrane dialyzer). Concerning ion exchange membranes, 12 sheets of CMV supplied by Asahi Glass Co., Ltd. were used as cation exchange membranes, and 11 sheets of AMV supplied by Asahi Glass Co., Ltd. were used as anion exchange membranes. Concerning dialysis conditions, a concentrated liquid vessel was charged with 4 liters of a 1 wt % sodium chloride aqueous solution, each electrode vessel was charged with 4 liters of a 1 wt % sodium chloride aqueous solution, and a starting liquid vessel was charged with the polymer aqueous solution from which the monomer was removed. While these liquids were circulated at a flow rate of 125 liters/hour, a DC voltage of 13.5 volts was applied between the electrodes. Under the above conditions, the ion exchange membrane electrodialysis was carried out for 5 hours until a conductivity of 1,950 µS/cm was reached, whereby a purified copolymer of N,N-dimethylallylamine and diallylamine was obtained in the form of an aqueous solution. The recovery ratio (potentiometric titration) of the polymer was 95%. When part of the above aqueous solution was combusted in an oven at 650° C. for 2.5 hours to determine an ignition residue content, it showed an ignition residue content of 0.3% by weight based on the polymer. The polymer had a weight average molecular weight, determined by GPC, of 1,700.

Figure 7:
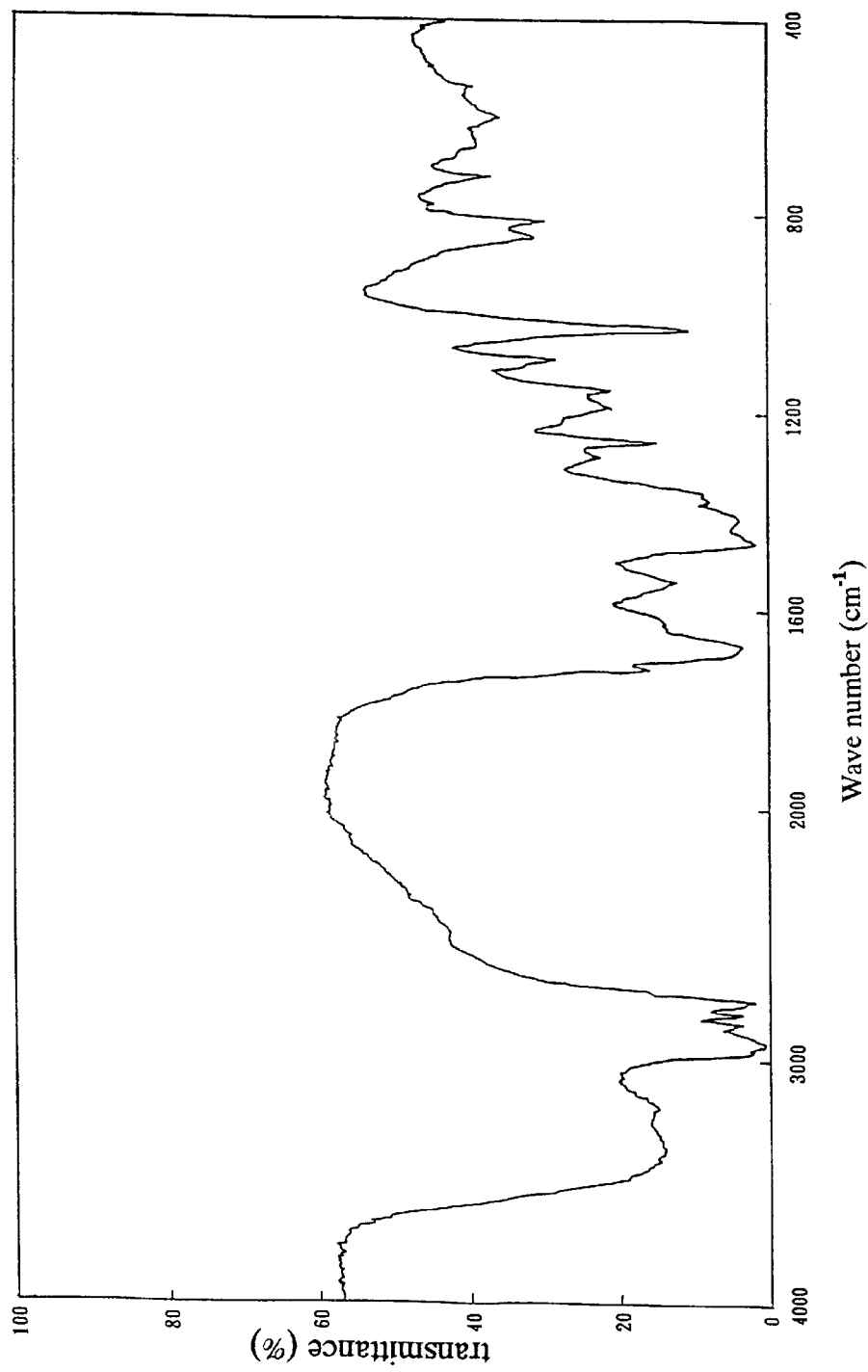
FIG. 7 is an IR spectrum of a copolymer of N,N-dimethylallylamine and diallylamine, obtained in Example 31.

Part of the above aqueous solution of the copolymer of N,N-dimethylallylamine and diallylamine was taken, water was distilled off under reduced pressure, and the remainder was dried to give a copolymer of N,N-dimethylallylamine and diallylamine in the form of a solid. FIG. 7 shows an IR spectrum of the obtained copolymer. Absorption at 920 cm$^{-1}$ and 995 cm$^{-1}$, based on out-of-plane deformation vibration derived from hydrogen atoms on double bonds, disappears, which supports that the obtained copolymer was the copolymer as an end product.

EXAMPLE 32

Preparation of Purified Copolymer of N,N-dimethylallylamine and N-methyldiallylamine (Charged Molar Ratio 0.8:0.2)

A solution of a copolymer of N,N-dimethylallylamine hydrochloride and N-methyldiallylamine hydrochloride, obtained in the same manner as in Example 25, was neutralized, a monomer was removed, and ion exchange membrane electrodialysis was carried out, in the same manner as in Example 31, to give a purified aqueous solution of a copolymer of N,N-dimethylallylamine and N-methyldiallylamine in the form of an aqueous solution. The recovery ratio (potentiometric titration) of the polymer was 96%. When part of the above aqueous solution was combusted in an oven at 650° C. for 2.5 hours to determine an ignition residue content, it showed an ignition residue content of 0.3% by weight based on the polymer. The polymer had a weight average molecular weight, determined by GPC, of 1,400.

Figure 8:
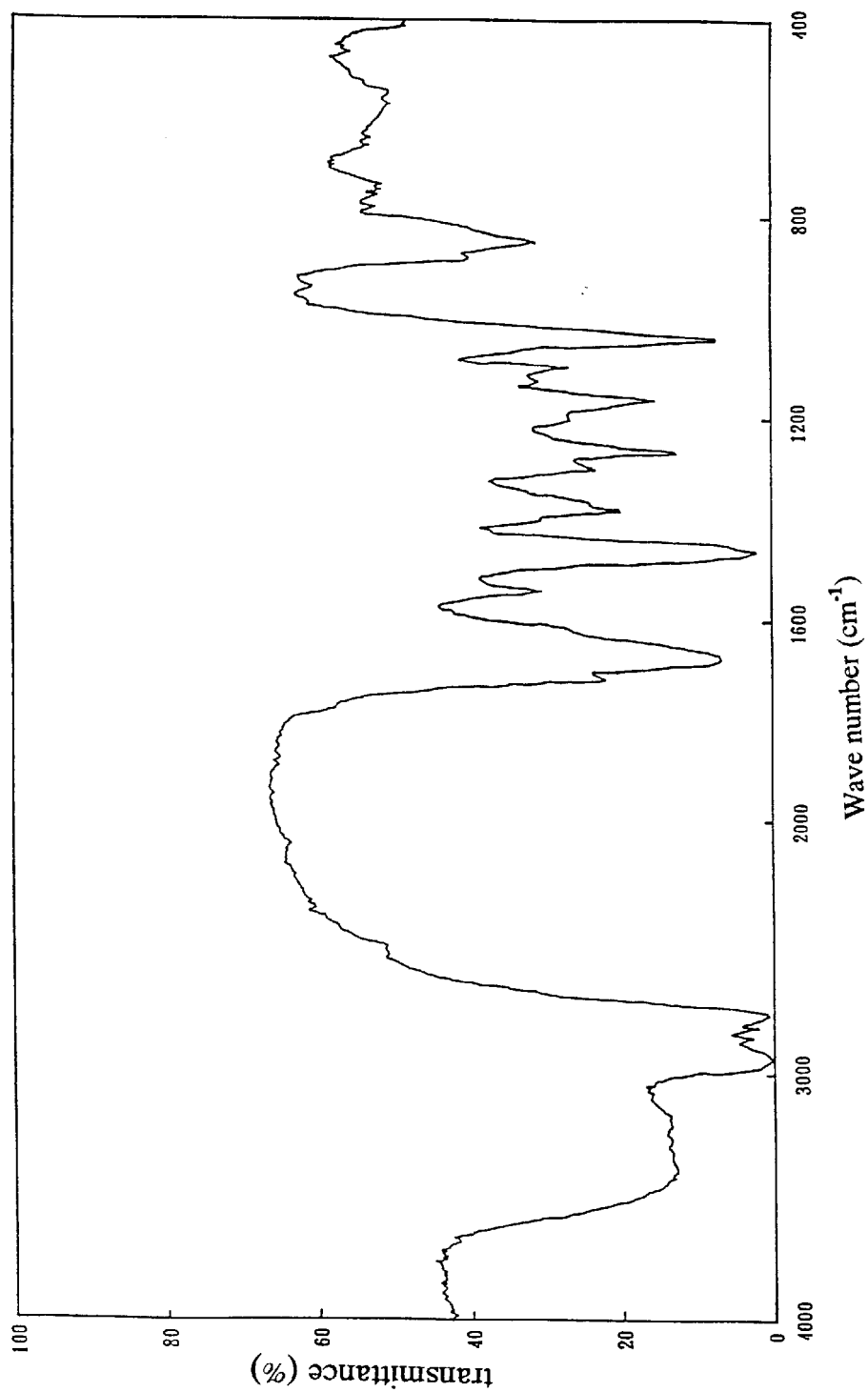
FIG. 8 is an IR spectrum of a copolymer of N,N-dimethylallylamine and N-methyldiallylamine, obtained in Example 32.

FIG. 8 shows an IR spectrum of the copolymer of N,N-dimethylallylamine and N-methyldiallylamine (charged molar ratio 0.8:0.2) obtained in the form of a solid in the same manner as in Example 31.

EXAMPLE 33

Preparation of Purified Copolymer of N,N-dimethylallylamine and N-(2-hydroxyethyl) diallylamine (Charged Molar Ratio 0.8:0.2)

A solution of a copolymer of N,N-dimethylallylamine hydrochloride and N-(2-hydroxyethyl)diallylamine hydrochloride (charged molar ratio 0.8:0.2), obtained in the same manner as in Example 28, was neutralized, a monomer was removed, and ion exchange membrane electrodialysis was carried out, in the same manner as in Example 31, to give a purified aqueous solution of a copolymer of N,N-dimethylallylamine and N-(2-hydroxyethyl)diallylamine (charged molar ratio 0.8:0.2) in the form of an aqueous solution. The recovery ratio (potentiometric titration) of the polymer was 94%. When part of the above aqueous solution was combusted in an oven at 650° C. for 2.5 hours to determine an ignition residue content, it showed an ignition residue content of 0.3% by weight based on the polymer. The polymer had a weight average molecular weight, determined by GPC, of 1,700.

Figure 9:
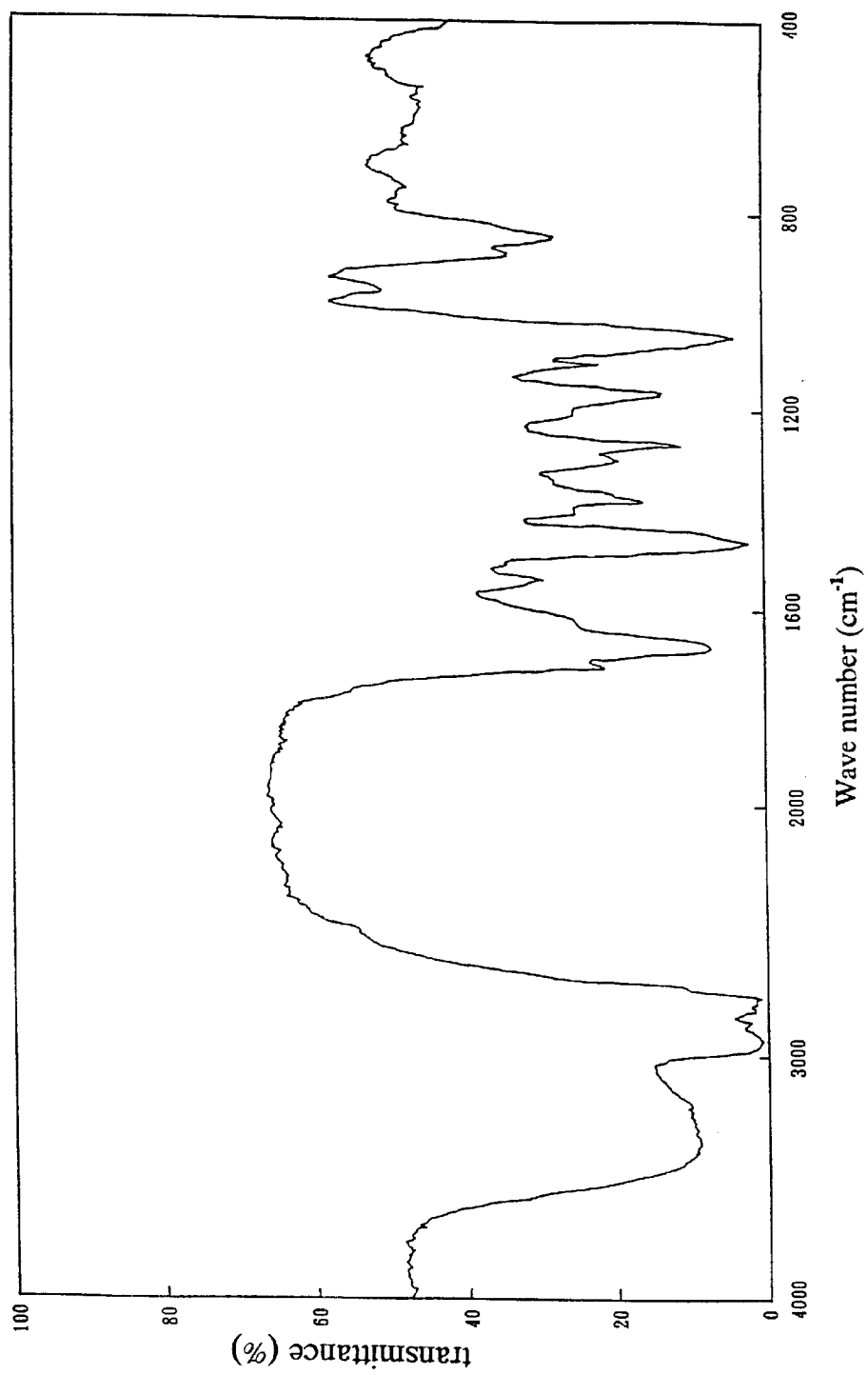
FIG. 9 is an IR spectrum of a copolymer of N,N-dimethylallylamine and N-(2-hydroxyethyl)diallylamine, obtained in Example 33.

FIG. 9 shows an IR spectrum of the copolymer of N,N-dimethylallylamine and N-(2-hydroxyethyl) diallylamine (charged molar ratio 0.8:0.2) obtained in the form of a solid in the same manner as in Example 31.

EXAMPLE 34

Preparation of Purified Copolymer of N,N-dimethylallylamine hydrochloride and diallylamine hydrochloride (Charged Molar Ratio 0.8:0.2)

Figure 10:
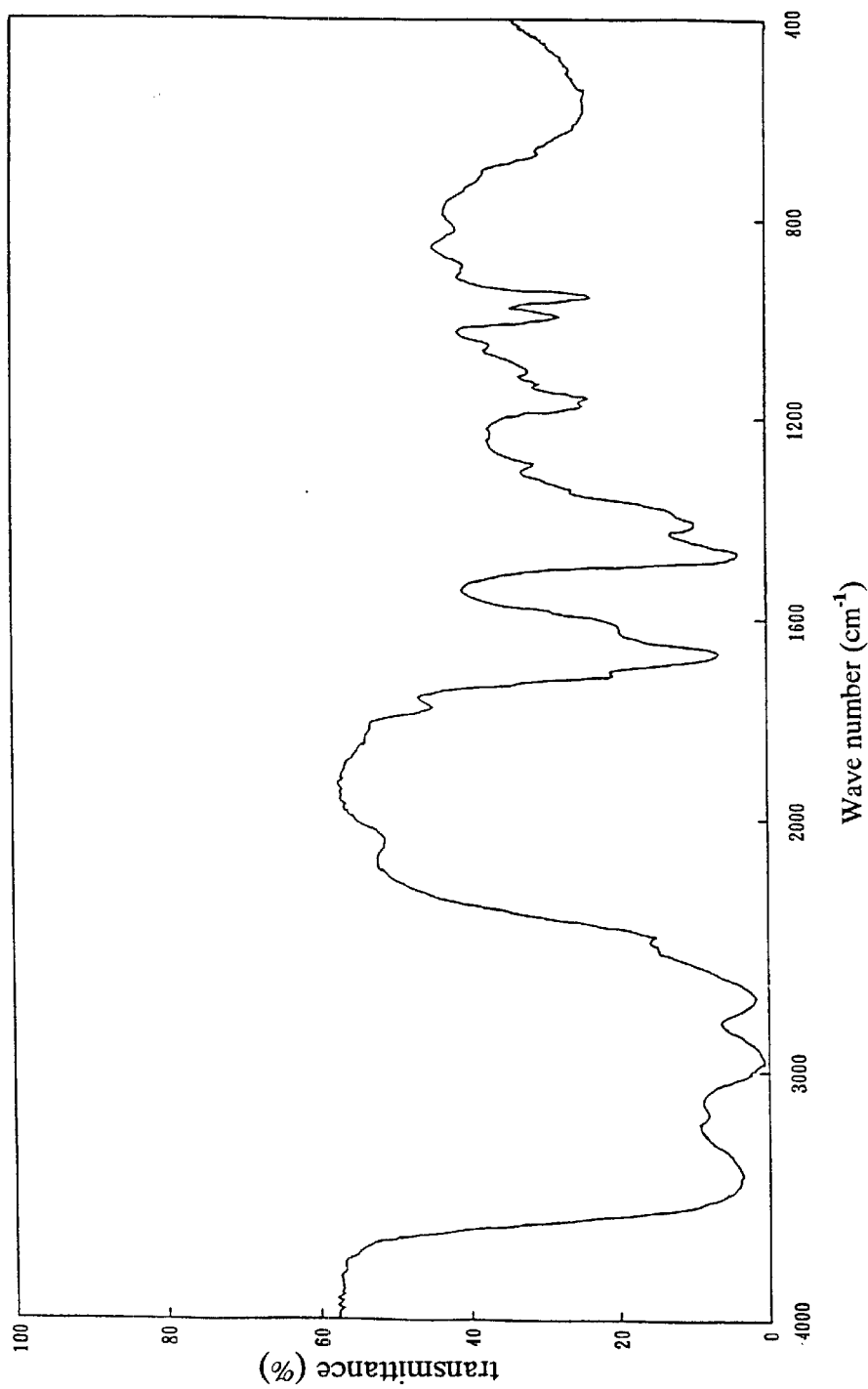
FIG. 10 is an IR spectrum of a copolymer of N,N-dimethylallylamine hydrochloride and diallylamine hydrochloride, obtained in Example 34.

The purified aqueous solution of copolymer of N,N-dimethylallylamine and diallylamine (7.5 mmol in terms of an amine monomer unit), obtained in Example 31, was used as a raw material. A 35 wt % hydrochloric acid aqueous solution in an amount equimolar to the amine monomer unit of the polymer was added thereto, the resultant solution was concentrated, and then placed in acetone-isopropanol 1:1 (weight ratio) mixed solvents. A formed precipitate was recovered by filtration and dried to give a copolymer of N,N-dimethylallylamine hydrochloride and diallylamine hydrochloride (charged molar ratio 0.8:0.2) in the form of a solid. FIG. 10 shows an IR spectrum of the copolymer. Absorption at 920 cm$^{-1}$ and 995 cm$^{-1}$, based on out-of-plane deformation vibration derived from hydrogen atoms on double bonds, disappears, which supports that the obtained copolymer was the copolymer as an end product.

EXAMPLE 35

Preparation of Purified Copolymer of N,N-dimethylallylamine hydrochloride and N-methyldiallylamine hydrochloride (Charged Molar Ratio 0.8:0.2)

Figure 11:
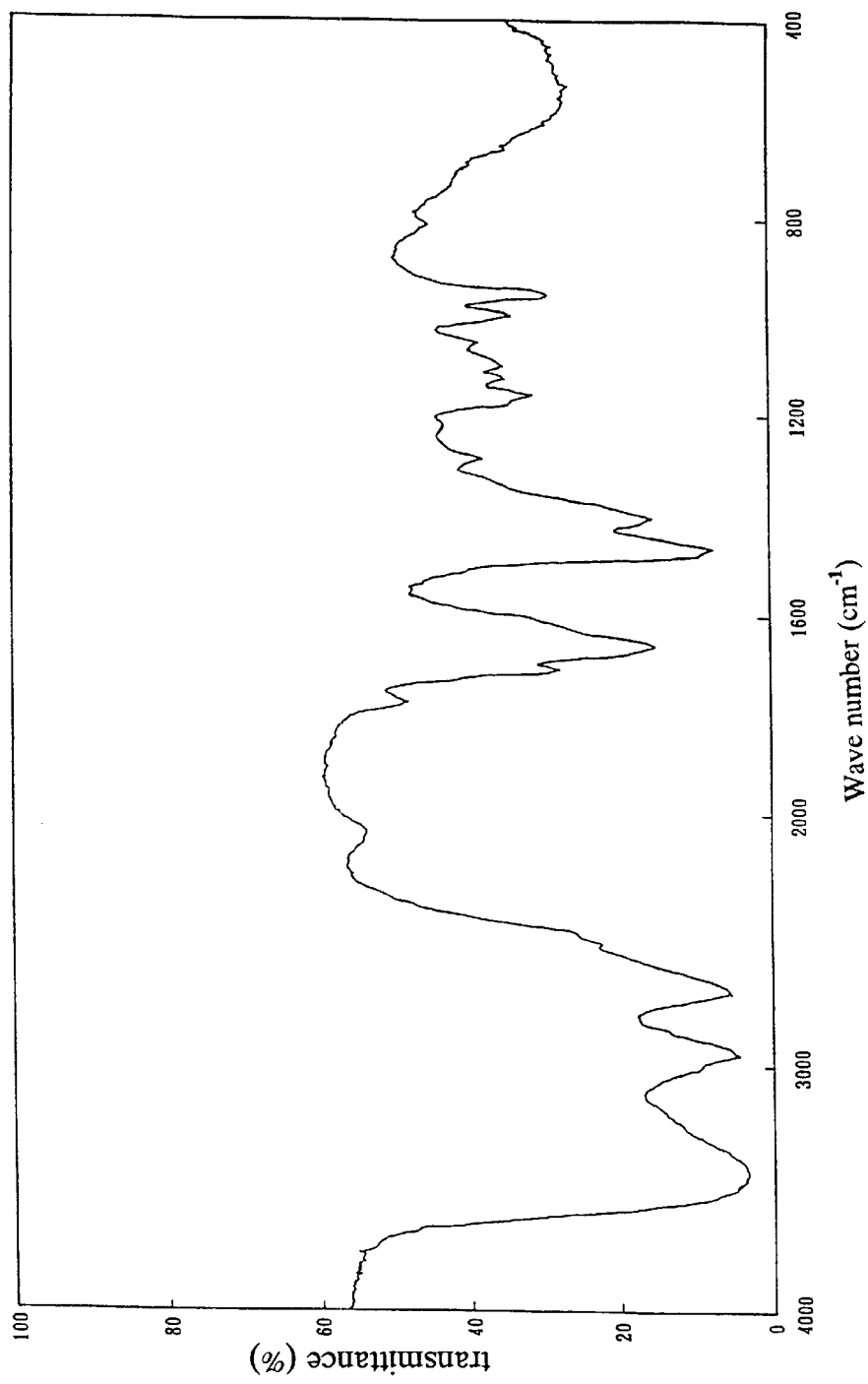
FIG. 11 is an IR spectrum of a copolymer of N,N-dimethylallylamine hydrochloride and N-methyldiallylamine hydrochloride, obtained in Example 35.

The purified aqueous solution of copolymer of N,N-dimethylallylamine and N-methyldiallylamine, obtained in Example 32, was used as a raw material. The same method of forming an hydrochloride as that described in Example 34 was carried out, to give a copolymer of N,N-dimethylallylamine hydrochloride and diallylamine hydrochloride. FIG. 11 shows an IR spectrum of the copolymer.

EXAMPLE 36

Preparation of Purified Copolymer of N,N-dimethylallylamine hydrochloride and N-(2-hydroxyethyl)diallylamine hydrochloride (Charged Molar Ratio 0.8:0.2)

Figure 12:
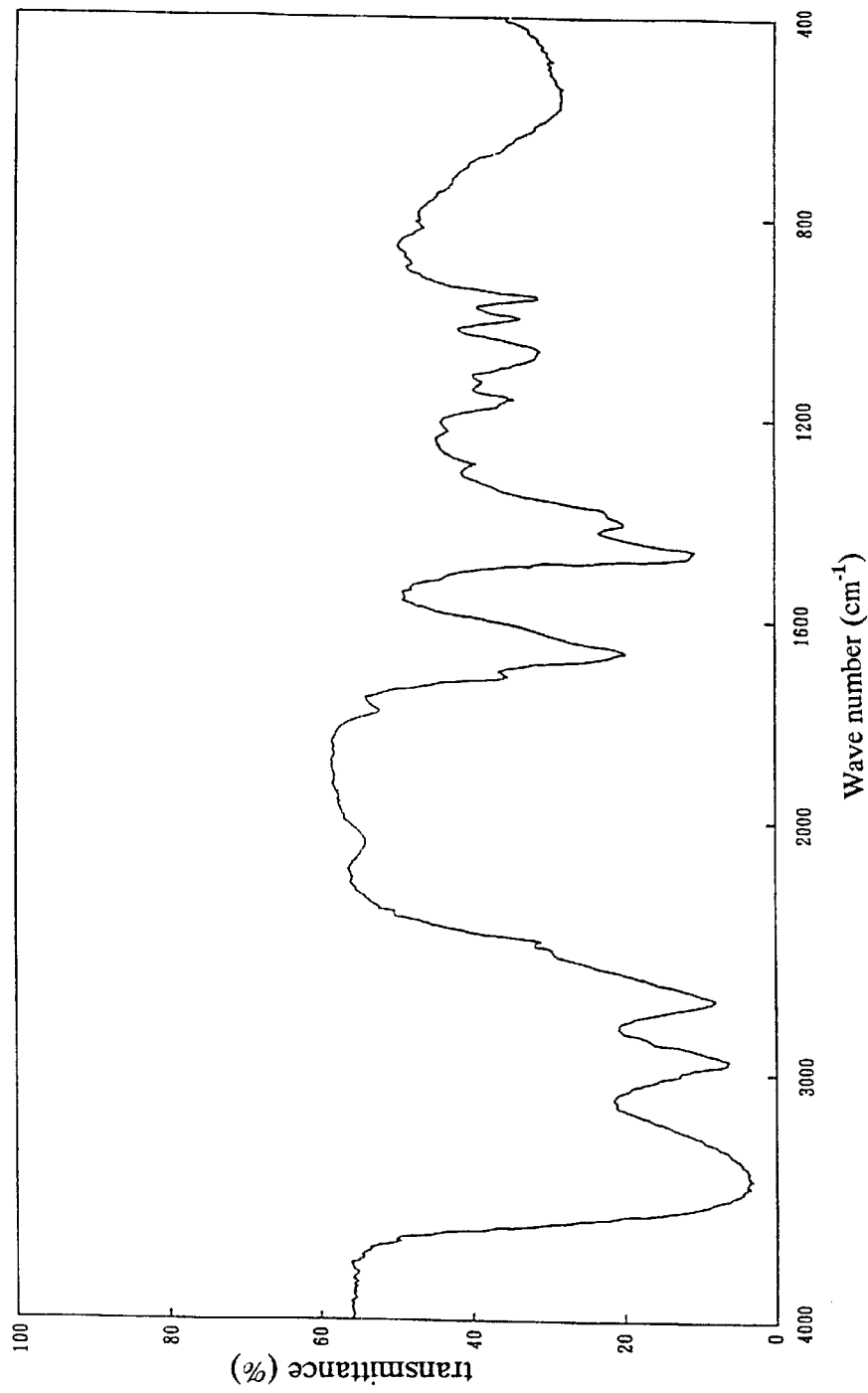
FIG. 12 is an IR spectrum of N,N-dimethylallylamine hydrochloride and N-(2-hydroxyethyl)diallylamine hydrochloride, obtained in Example 36.

The purified aqueous solution of copolymer of N,N-dimethylallylamine and N-(2-hydroxyethyl)diallylamine, obtained in Example 33, was used as a raw material. The same method of forming an hydrochloride as that described in Example 35 was carried out, to give a copolymer of N,N-dimethylallylamine hydrochloride and N-(2-hydroxyethyl)diallylamine hydrochloride. FIG. 12 shows an IR spectrum of the copolymer.

[Solubility of Copolymers of N,N-dimethylallylamine hydrochloride and N-substituted or Non-substituted diallylamine diallylamine hydrochloride in Various Solvents]

0.1 Gram of each of the copolymers of N,N-dimethylallylamine hydrochloride and N-substituted or non-substituted diallylamine hydrochloride, obtained in Examples 34 to 36, was taken and studied for a solubility (30° C.) in various solvents (5 ml). As a comparative polymer, a monoallylamine hydrochloride homopolymer (PAA HCl-3S, molecular weight about 10,000, supplied by Nitto Boseki Co., Ltd.) was used. Table 7 shows the results.

TABLE 7

| Polymer DMAA/ | Water | Methanol | Diethylene glycol | Ethylene glycol | Acetone |
|---|---|---|---|---|---|
| DAA (0.8/0.2) | Soluble | Soluble | Soluble | Soluble | Insoluble |
| DMAA/ MDAA (0.8/0.2) | Soluble | Soluble | Soluble | Soluble | Insoluble |
| DMAA/ HEDAA (0.8/0.2) | Soluble | Soluble | Soluble | Soluble | Insoluble |
| Allylamine homopolymer | Soluble | Insoluble | Insoluble | Soluble | Insoluble |

| Polymer | Ethanol | Isopropanol | Formamide | DMF |
|---|---|---|---|---|
| DMAA/DAA (0.8/0.2) | Soluble | Insoluble | Soluble | Insoluble |
| DMAA/ MDAA (0.8/0.2) | Soluble | Insoluble | Soluble | Insoluble |
| DMAA/ HEDAA (0.8/0.2) | Soluble | Insoluble | Soluble | Insoluble |
| Allylamine homopolymer | Insoluble | Insoluble | Soluble | Insoluble |

As shown in Table 7, it has been found that the copolymers obtained according to the present invention were also more soluble in organic solvents than the comparative polymer.

Application Example 1

Aluminum Corrosion Test

The N,N-dimethylallylamine polymer produced and purified in Example 6 was neutralized to a pH of 7 with an acetic acid aqueous solution, to obtain a purified N,N-dimethylallylamine polymer aqueous solution (0.02 mol/liter in terms of a monomer unit). An aluminum lamina was placed therein and allowed to stand at 60° C. to study a day (corrosion day) when the aluminum surface began to be corroded. As a result, the corrosion day was the 13th day. On the other hand, for comparison, the polymer aqueous solution which is described in Example 6 but which was neither neutralized nor subjected to ion exchange membrane electrodialysis was adjusted to a pH of 7, to obtain a crude N,N-dimethylallylamine polymer aqueous solution. The thus-obtained solution was studied for a corrosion day to show the 4th day. It has been found that the N,N-dimethylallylamine polymer aqueous solution which is purified by ion exchange membrane electrodialysis is good for metal corrosion.

Application Example 2

Thermal-sensitive Data

The purified N,N-dimethylallylamine polymer aqueous solution obtained in Example 6 was adjusted to a concentration of 5% by weight at room temperature, and the thus-prepared aqueous solution was temperature-elevated at a rate of 1° C. per minute. Up to 42° C., the transmittance of the solution was almost 100% (measured at a wavelength of 500 nm), while the transmittance became almost 0% at 45° C. or higher. The clouding point was 43.5° C.

Similarly, when an emulsion formed of a mixture containing the purified N,N-dimethylallylamine polymer and water, which emulsion was maintained at 50° C., was temperature-decreased at a rate of 1° C. per minute, the clouding point was 43.5° C., and at a temperature lower than that, it became a solution.

It has been found that a mixture of the N,N-dimethylallylamine polymer produced and purified according to the process of the present invention with water constitutes a thermal-sensitive thermally reversible material which becomes cloudy at a high temperature and becomes a solution at a low temperature.

Figure 13:
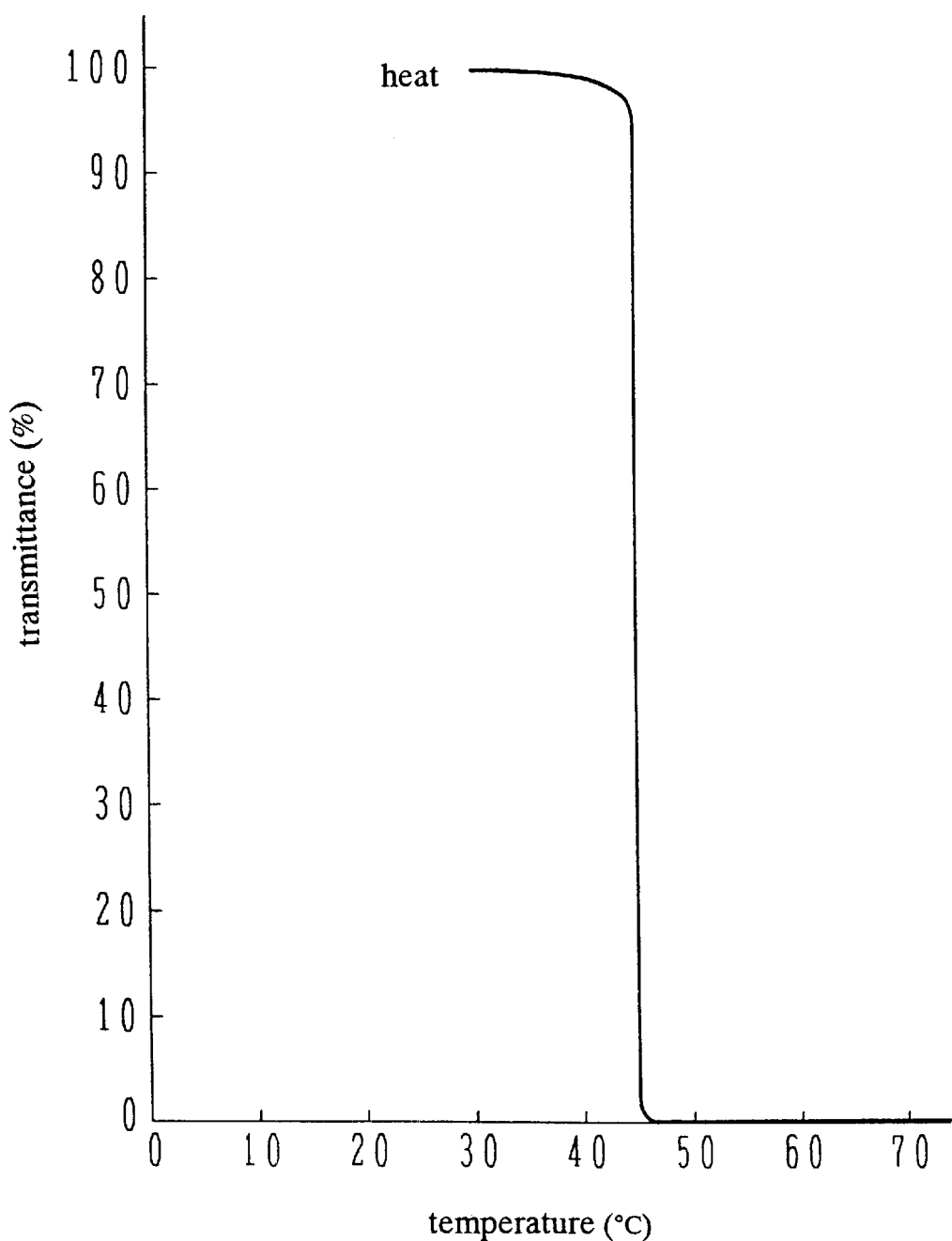
FIG. 13 is a graph showing a relationship between temperature and transmittance in the process of heating a mixture of an N,N-dimethylallylamine polymer with water in Application Example 2.

FIG. 13 shows a graph of relationship between temperatures and transmittances when a mixture of the purified N,N-dimethylallylamine polymer with water is heated.

Application Example 3

Composition 1: Preparation of ink set 1

<Yellow>

There was prepared a yellow ink containing 2% by weight (solid content) of the purified N,N-dimethylallylamine polymer obtained in Example 6, 2% by weight of C.I. Direct Yellow 86, 10% by weight of glycerin, 10% by weight of diethylene glycol, 5% by weight of 2-pyrrolidone, 1% by weight of Surfynol 465 and a balance of water.

<Magenta>

There was prepared a magenta ink containing 3% by weight (solid content) of the purified N,N-dimethylallylamine polymer obtained in Example 6, 2.5% by weight of C.I. Acid Red 289, 15% by weight of glycerin, 15% by weight of triethylene glycol, 1% by weight of Surfynol 465 and a balance of water.

<Cyan>

There was prepared a cyan ink containing 2% by weight (solid content) of the purified N,N-dimethylallylamine polymer obtained in Example 6, 3% by weight of C.I. Direct Blue 86, 10% by weight of thioglycol, 15% by weight of ethylene glycol, 1% by weight of Surfynol 465 and a balance of water.

<Black>

There was prepared a black ink containing 2% by weight (solid content) of the purified N,N-dimethylallylamine polymer obtained in Example 6, 3% by weight of C.I. Food Black 2, 10% by weight of glycerin, 15% by weight of diethylene glycol, 1% by weight of Surfynol 465 and a balance of water.

A combination of the above four inks is taken as an ink set 1.

Comparative Composition 1: Preparation of Color Ink Set 2

A yellow ink 2, a magenta ink 2, a cyan ink 2 and a black ink 2 were obtained in the same manner as in Composition 1 except that the N,N-dimethylallylamine polymer was not used. A combination of these four inks is taken as an ink set 2.

Comparative Composition 2: Synthesis of N,N-dimethylallylamine Polymer and Preparation of Color Ink Set 3

First, a hydrochloride of a monoallylamine was polymerized in the presence of an azo-containing radical initiator according to the method described in JP-A-60-108405, and formic acid and formaldehyde were reacted with the obtained polyallylamine, to synthesize an N,N-dimethylallylamine polymer.

The above N,N-dimethylallylamine polymer was used, and a yellow ink 3, a magenta ink 3, a cyan ink 3 and a black ink 3 were obtained in the same manner as in Composition 1. A combination of these four inks was taken as an ink set 3. The ink set was intensely odorous due to residual formaldehyde in the N,N-dimethylallylamine polymer obtained by the above synthesis method, and might cause a bad effect on human bodies and environments.

Evaluation Test of Performances of Ink Composition

The above-prepared ink compositions were evaluated according to the following method.

As a printer, an inkjet-recording-method-applied printer (Color Printer MJ-5000C, supplied by Seiko-Epson K.K.) was used. Further, the inks were filtered through a 5 µm filter before the evaluation.

Evaluation Test 1: Water Resistance

Set-solid printing of black, yellow, magenta, cyan, red, green and blue having a width of 1.5 cm was made on an ordinary paper (trade name: Zerox-P supplied by Fuji Zerox K.K.) having a size of A4 as a recording medium at intervals of 3.5 cm (non-recorded portion). A recorded paper was left as it was for 1 hour and then immersed in 500 ml of water for 1 hour. After the immersion, the recorded paper was spontaneously dried for 24 hours, and a non-recorded portion was visually evaluated for a shifted-ink density, and a recorded portion was visually evaluated for a remaining ink. The result was evaluated on the basis of the following ratings.

Evaluation A: A non-recorded portion was not colored at all. No change was found in a recorded portion.

Evaluation B: A non-recorded portion had a slightly coloring ink.

Evaluation NG: A non-recorded portion had a notably adhering ink. A recorded portion showed a decrease in density.

Evaluation Test 2: Light Resistance

The same recording medium and the same printer as those in Evaluation test 1 were used, and full color images were printed using combinations of an black ink and color ink sets prepared in Composition 1, Comparative compositions 1 and 2. The so-printed papers were evaluated for light resistance according to the day and night method of the daylight test JIS0841. The results were evaluated on the basis of the following ratings.

Evaluation AA: On the basis of a blue scale, there was no grade change relative to an ink containing no cationic water-soluble resin.

Evaluation A: A grade change is less than 1 grade.

Evaluation B: A grade change is 1 or 2 grades.

Evaluation NG: A grade change is over 2 grades.

Evaluation Test 3: Environmental Stability

A container with an ink sealed therein was exposed to 10 cycles each of which consisted of allowing the container to stand at 60° C. for 1 day and then allowing the container to stand at −30° C. for 1 day. Then, the ink was visually observed for an occurrence of a precipitate and an occurrence of a change in color. The result was evaluated on the basis of the following ratings.

Evaluation A: No change

Evaluation B: A precipitate or a color change was observed.

Evaluation NG: An outstanding precipitate or color change was observed.

Table 8 shows the above results.

TABLE 8

| | Water resistance | Light resistance | Environmental stability |
|---|---|---|---|
| Ink set 1 | A | AA | A |
| Ink set 2 | NG | AA | A |
| Ink set 3 | A | A | A |

INDUSTRIAL UTILITY

There can be industrially advantageously produced, at high yields, an N,N-dialkylallylamine polymer or an addition salt thereof, a copolymer of N,N-dialkylallylamine and monoallylamine or an addition salt thereof, and a copolymer of N,N-dialkylallylamine and diallylamine or an addition salt thereof, which are useful for various uses in the field of fine chemicals and particularly useful as a water-resistance-imparting agent for an inkjet ink.

What is claimed is:

1. A process for the production of an N,N-dialkylallylamine polymer having a recurring unit of the general formula (II),

wherein each of $R^1$ and $R^2$ is independently an alkyl group having 1 to 4 carbon atoms, or an addition salt thereof, which comprises polymerizing an addition salt of an N,N-dialkylallylamine of the general formula (I),

wherein $R^1$ and $R^2$ are as defined above, in an aqueous solvent in the presence of 2 to 100 mol %, based thereon, of a radical initiator having a molecule containing an azo group or a persulfate radical initiator, and optionally neutralizing a polymerization solution.

2. The process of claim 1, wherein the radical polymerization initiator having a molecule containing an azo group is an initiator having a molecule containing an azo group and cationic nitrogens.

3. The process of claim 1, wherein the polymerization is carried out in the presence of 5 to 100 mol %, based on the addition salt of the N,N-dialkylallylamine, of the radical polymerization initiator having a molecule containing an azo group.

4. The process of claim 1, wherein the N,N-dialkylallylamine polymer or the addition salt thereof is for use in an inkjet ink.

5. A process for the production of an N,N-dialkylallylamine polymer having a recurring unit of the above general formula (II),

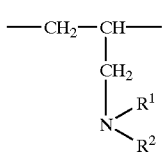

(II)

wherein each of $R^1$ and $R^2$ is independently an alkyl group having 1 to 4 carbon atoms, or an addition salt thereof, which comprises polymerizing an addition salt of an N,N-dialkylallylamine of the general formula (I),

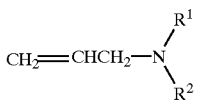

(I)

wherein $R^1$ and $R^2$ are as defined above, in an aqueous solvent in the presence of 2 to 100 mol %, based thereon, of a radical initiator having a molecule containing an azo group or a persulfate radical initiator, then, neutralizing a polymerization solution to bring a formed polymer into a free state, further, distilling off a residual monomer under reduced pressure, then, subjecting a remaining polymerization solution to an ion exchange membrane electrodialysis, and optionally carrying out acid treatment.

6. The process of claim 5, wherein the radical polymerization initiator having a molecule containing an azo group is an initiator having a molecule containing an azo group and cationic nitrogens.

7. The process of claim 5, wherein the polymerization is carried out in the presence of 5 to 100 mol %, based on the addition salt of the N,N-dialkylallylamine, of the radical polymerization initiator having a molecule containing an azo group.

8. The process of claim 5, wherein the N,N-dialkylallylamine polymer or the addition salt thereof is for use in an inkjet ink.

9. A process for the production of a copolymer of N,N-dialkylallylamine and monoallylamine, the copolymer having recurring units of the general formula (IV) and the general formula (II),

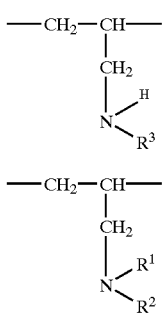

(IV)

(II)

wherein each of $R^1$ and $R^2$ is independently an alkyl group having 1 to 4 carbon atoms and $R^3$ is a hydrogen atom or an alkyl group having 1 to 4 carbon atoms, or an addition salt thereof, which comprises copolymerizing an addition salt of a monoallylamine of the general formula (III)

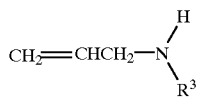

(III)

wherein $R^3$ is as defined above, and an addition salt of an N,N-dialkylallylamine of the general formula (I),

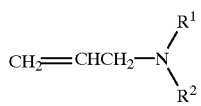

(I)

wherein $R^1$ and $R^2$ are as defined above, in an aqueous solvent in the presence of a radical initiator having a molecule containing an azo group or a persulfate radical initiator, and optionally neutralizing a polymerization solution.

10. The process of claim 9, wherein the copolymerization is carried out in the presence of 2 to 100 mol %, based on the total monomer amount, of the radical polymerization initiator having a molecule containing an azo group or the persulfate radical initiator.

11. The process of claim 9, wherein the radical polymerization initiator having a molecule containing an azo group is an initiator having a molecule containing an azo group and cationic nitrogens.

12. The process of claim 9, wherein the copolymer of N,N-dialkylallylamine and monoallylamine or the addition salt thereof is for use in an inkjet ink.

13. A process for the production of a copolymer of N,N-dialkylallylamine and monoallylamine, the copolymer having recurring units of the general formulae (IV) and the general formula (II),

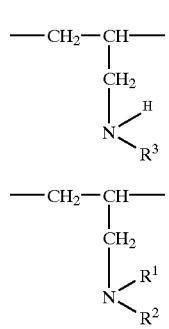

(IV)

(II)

wherein each of $R^1$ and $R^2$ is independently an alkyl group having 1 to 4 carbon atoms and $R^3$ is a hydrogen atom or an alkyl group having 1 to 4 carbon atoms, or an addition salt thereof, which comprises copolymerizing an addition salt of a monoallylamine of the general formula (III),

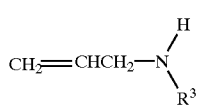

(III)

wherein $R^3$ is as defined above, and an addition salt of an N,N-dialkylallylamine of the general formula (I),

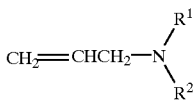
(I)

wherein $R^1$ and $R^2$ are as defined above, in an aqueous solvent in the presence of a radical initiator having a molecule containing an azo group or a persulfate radical initiator, then, neutralizing a polymerization solution to bring a formed copolymer into a free state, further, distilling off a remaining monomer under reduced pressure, subjecting the polymerization solution to an ion exchange membrane electrodialysis, and optionally carrying out acid treatment.

14. The process of claim 13, wherein the polymerization is carried out in the presence of 2 to 100 mol %, based on the total monomer amount, of the radical copolymerization initiator having a molecule containing an azo group or the persulfate radical initiator.

15. The process of claim 13, wherein the radical polymerization initiator having a molecule containing an azo group is an initiator having a molecule containing an azo group and cationic nitrogens.

16. The process of claim 13, wherein the copolymer of N,N-dialkylallylamine and monoallylamine or the addition salt thereof is for use in an inkjet ink.

17. A process for the production of a copolymer of N,N-dialkylallylamine and N-substituted or non-substituted diallylamine, or an addition salt thereof, which comprises copolymerizing an addition salt of an N,N-dialkylallylamine of the general formula (I),

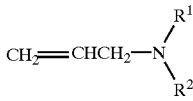
(I)

wherein each of $R^1$ and $R^2$ is independently an alkyl group having 1 to 4 carbon atoms, and an addition salt of an N-substituted or non-substituted diallylamine in an aqueous solvent in the presence of a radical initiator having a molecule containing an azo group or a persulfate radical initiator, and optionally neutralizing a polymerization solution.

18. The process of claim 17, wherein the N-substituted or non-substituted diallylamine is a compound of the general formula (V),

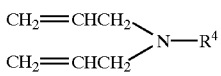
(V)

wherein $R^4$ is a hydrogen atom or an alkyl group having 1 to 3 carbon atoms, which alkyl group may contain a hydroxyl group.

19. The process of claim 17, wherein the N-substituted or non-substituted diallylamine is used in a molar amount equivalent to, or smaller than, a molar amount of the N,N-dialkylallylamine.

20. The process of claim 17, wherein the polymerization is carried out in the presence of 2 to 100 mol %, based on the total monomer amount, of the radical polymerization initiator having a molecule containing an azo group or the persulfate radical initiator.

21. The process of claim 17, wherein the radical polymerization initiator having a molecule containing an azo group is an initiator having a molecule containing an azo group and cationic nitrogens.

22. The process of claim 17, wherein the copolymer of N,N-dialkylallylamine and N-substituted or non-substituted diallylamine or the addition salt thereof is for use in an inkjet ink.

23. A process for the production of a copolymer of N,N-dialkylallylamine and N-substituted or non-substituted diallylamine, or an addition salt thereof, which comprises copolymerizing an addition salt of an N,N-dialkylallylamine of the above general formula (I),

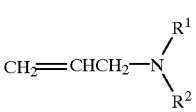
(I)

wherein each of $R^1$ and $R^2$ is independently an alkyl group having 1 to 4 carbon atoms, and an addition salt of an N-substituted or non-substituted diallylamine in an aqueous solvent in the presence of a radical initiator having a molecule containing an azo group or a persulfate radical initiator, neutralizing a polymerization solution to bring a formed copolymer into a free state, further, distilling off a residual monomer under reduced pressure, then, subjecting the polymerization solution to an ion exchange membrane electrodialysis, and optionally carrying out acid treatment.

24. The process of claim 23, wherein the N-substituted or non-substituted diallylamine is a compound of the general formula (V),

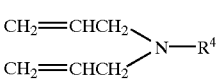
(V)

wherein $R^4$ is a hydrogen atom or an alkyl group having 1 to 3 carbon atoms, which alkyl group may contain a hydroxyl group.

25. The process of claim 23, wherein the N-substituted or non-substituted diallylamine is used in a molar amount equivalent to, or smaller than, a molar amount of the N,N-dialkylallylamine.

26. The process of claim 23, wherein the copolymerization is carried out in the presence of 2 to 100 mol %, based on the total monomer amount, of the radical polymerization initiator having a molecule containing an azo group or the persulfate radical initiator.

27. The process of claim 23, wherein the radical polymerization initiator having a molecule containing an azo group is an initiator having a molecule containing an azo group and cationic nitrogens.

28. The process of claim 23, wherein the copolymer of N,N-dialkylallylamine and N-substituted or non-substituted diallylamine or the addition salt thereof is for use in an inkjet ink.

* * * * *